(12) United States Patent
Yerli

(10) Patent No.: US 12,041,100 B2
(45) Date of Patent: Jul. 16, 2024

(54) VIDEOCONFERENCING MEETING SLOTS VIA SPECIFIC SECURE DEEP LINKS

(71) Applicant: TMRW Foundation IP S. À R.L., Luxembourg (LU)

(72) Inventor: Cevat Yerli, Frankfurt am Main (DE)

(73) Assignee: TMRW FOUNDATION IP S.ÀR.L., Luxembourg (LU)

( * ) Notice: Subject to any disclaimer, the term of this patent is extended or adjusted under 35 U.S.C. 154(b) by 0 days.

(21) Appl. No.: 17/880,543

(22) Filed: Aug. 3, 2022

(65) Prior Publication Data

US 2024/0048599 A1 Feb. 8, 2024

(51) Int. Cl.
*H04L 12/18* (2006.01)
*H04L 9/40* (2022.01)
*H04L 65/403* (2022.01)

(52) U.S. Cl.
CPC ........ *H04L 65/403* (2013.01); *H04L 12/1818* (2013.01); *H04L 12/1822* (2013.01); *H04L 63/0884* (2013.01)

(58) Field of Classification Search
CPC .......................... H04L 12/1818; H04L 12/1822
See application file for complete search history.

(56) References Cited

U.S. PATENT DOCUMENTS

| | | | |
|---|---|---|---|
| 8,855,285 B1* | 10/2014 | Bracken | H04L 65/1104 379/202.01 |
| 10,042,946 B2 | 8/2018 | Boudville | |
| 10,346,826 B2 | 7/2019 | Boudville | |
| 11,238,660 B2* | 2/2022 | Charlton | G06N 20/00 |
| 11,308,228 B1* | 4/2022 | Tian | G06Q 20/3674 |
| 11,683,444 B2* | 6/2023 | John | H04N 7/15 348/14.08 |
| 2006/0184886 A1* | 8/2006 | Chung | G06Q 10/107 715/758 |
| 2009/0254843 A1 | 10/2009 | Van Wie et al. | |
| 2011/0029398 A1 | 2/2011 | Boudville | |
| 2012/0246582 A1 | 9/2012 | Leacock et al. | |

(Continued)

FOREIGN PATENT DOCUMENTS

WO 2018013264 A1 1/2018

OTHER PUBLICATIONS

Adjust GmbH, "The Adjust Guide to Deep Linking," undated document, pp. 1-17, available from https://www.adjust.com/resources/ebooks/adjust-deep-linking-guide/.

(Continued)

*Primary Examiner* — Nazia Naoreen
(74) *Attorney, Agent, or Firm* — BRYAN CAVE LEIGHTON PAISNER LLP

(57) ABSTRACT

A method for generating secure deep links comprises generating a deep link generation request; receiving a videoconferencing meeting slot list, wherein each videoconferencing meeting slot comprises at least a location within a videoconferencing space of a videoconferencing platform stored in memory; and generating a deep link that is unique for each videoconferencing meeting slot, the deep link encoding at least the location of the videoconferencing meeting slot within the videoconferencing space. Methods for generating spatial deep links for virtual spaces for inviting participants, and methods for generating distributed deep links using data fragments that may be reassembled, are also described.

18 Claims, 15 Drawing Sheets

(56) References Cited

U.S. PATENT DOCUMENTS

| | | |
|---|---|---|
| 2013/0104057 A1 | 4/2013 | Leacock et al. |
| 2016/0247123 A1* | 8/2016 | Holst ................. G06Q 10/1095 |
| 2018/0352303 A1 | 12/2018 | Siddique et al. |
| 2021/0111950 A1 | 4/2021 | Moyers et al. |
| 2021/0334405 A1 | 10/2021 | Levy et al. |
| 2021/0337166 A1 | 10/2021 | John et al. |
| 2021/0342424 A1 | 11/2021 | Tamir et al. |
| 2023/0092103 A1* | 3/2023 | Puyol ...................... G06F 3/017 |
| | | 715/205 |

OTHER PUBLICATIONS

Lopes, C.V., "Hypergrid: Architecture and Protocol for Virtual World Interoperability," IEEE Internet Computing, Sep./Oct. 2011, pp. 22-29.

\* cited by examiner

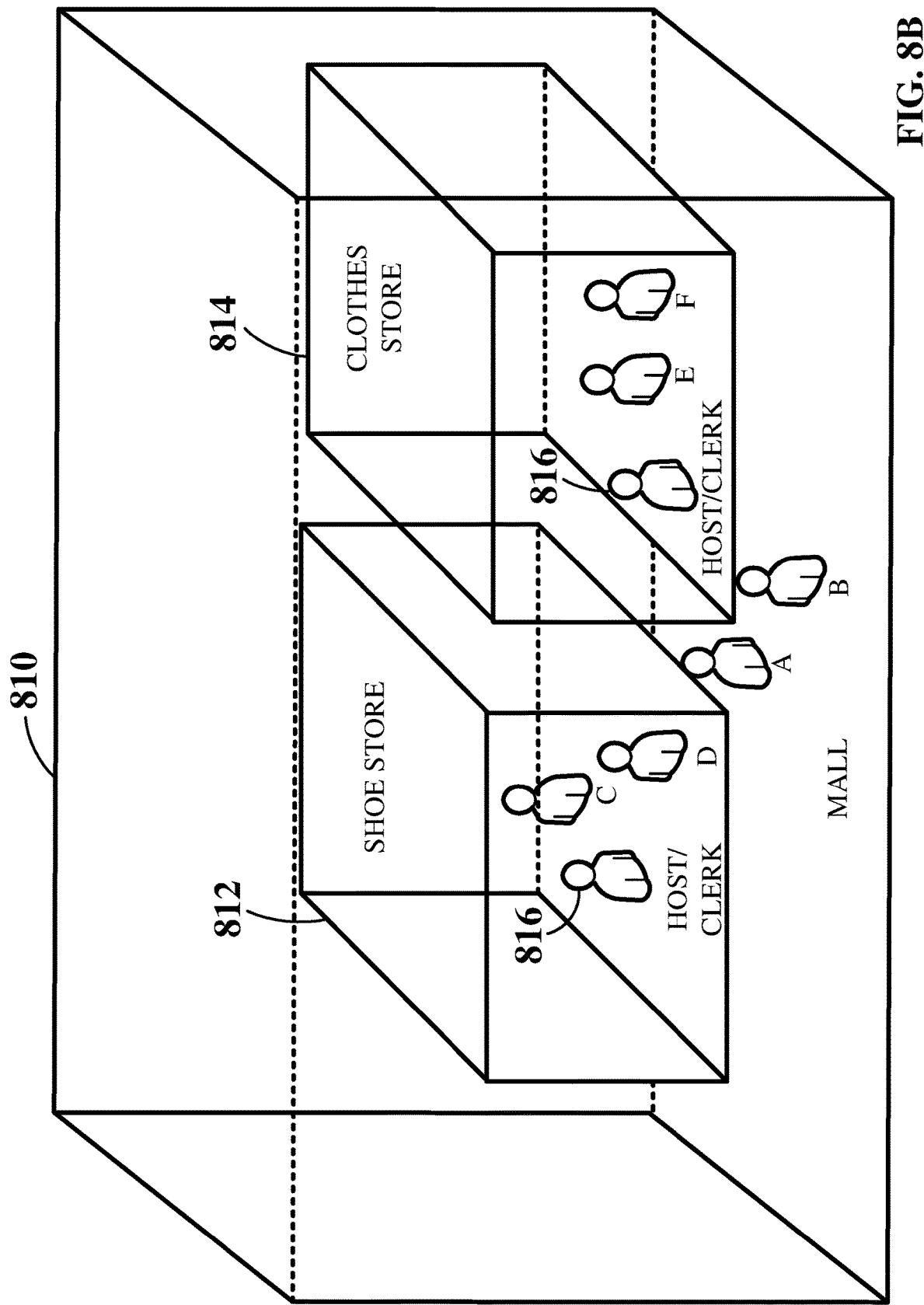

1000

1002

RECEIVE A DEEP LINK GENERATION REQUEST THAT IS TRIGGERED WHEN A PARTICIPANT OF A VIDEOCONFERENCING SESSION HOSTED IN A VIDEOCONFERENCING PLATFORM INVITES AN INVITEE TO JOIN THE VIDEOCONFERENCING SESSION

1004

RETRIEVE VIDEOCONFERENCING SESSION CONTEXT DATA AND A SESSION COMMUNICATION INSTANCE

1006

GENERATE A DEEP LINK COMPRISING VIDEOCONFERENCING SESSION CONTEXT DATA, WHEREIN THE VIDEOCONFERENCING PLATFORM COMPRISES AT LEAST ONE VIDEOCONFERENCING SPACE HOSTING THE VIDEOCONFERENCING SESSION, WHEREIN THE AT LEAST ONE VIDEOCONFERENCING SPACE IS A 3D VIRTUAL ENVIRONMENT

FIG. 10

VIDEOCONFERENCING MEETING SLOTS VIA SPECIFIC SECURE DEEP LINKS

FIELD

The current disclosure refers generally computer systems, and more specifically to a method and system enabling videoconferencing meeting slots via specific secure deep links.

BACKGROUND

With the increasing number of videoconferences and other virtual events taking place worldwide, along with the growing amount of deep fake videos and meeting ID data theft, a heightened security and quality of management is required for these videoconferences. For example, it is not uncommon that videoconferencing meeting links are leaked by one or more participants, which may allow intruders to hijack the meetings and disrupt the experience for the meeting participants.

Furthermore, given the current state of development of wearable immersive technologies such as extended reality (e.g., augmented and/or virtual reality) and the relatively low technological appropriation rate, it is understandable that most videoconferencing solutions provide a flat, 2D user interface where most interactions take place. However, the low levels of realism, user presence, and shared space and the limited number and quality of interactions one can perform when comparing the real-life experience to these solutions contribute to a feeling of loneliness or boredom for many users, in turn resulting sometimes in a lower productivity than when performing the same activities in person.

Therefore, it is desired to have secure videoconferencing measures and life-like mechanics that may increase the security and realism of the user experience.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, a method for generating secure deep links implemented by a computer comprising at least one processor and memory comprises receiving, by a deep link generator stored in memory, a deep link generation request; receiving a videoconferencing meeting slot list, wherein a videoconferencing meeting slot in the meeting slot list comprises a location within a videoconferencing space of a videoconferencing platform stored in memory; and generating a deep link corresponding to the videoconferencing meeting slot, wherein the deep link is configured to, upon activation, direct a first participant to the location of the videoconferencing meeting slot within the videoconferencing space.

In some embodiments, the method further comprises receiving a participant list, wherein each of the plurality of participants has one or more associated attributes; and creating a meeting slot protocol by allocating a videoconferencing meeting slot to each of the plurality of participants based on the one or more associated attributes of the respective participants. In some embodiments, the method further comprises sending the deep link to a participant client device; receiving a message from the participant client device confirming participation of the first participant on a corresponding videoconferencing session using information in the deep link; triggering the video conferencing session for the first participant; and assigning the first participant to the corresponding videoconferencing meeting slot based on a meeting slot protocol.

In some embodiments, a videoconferencing meeting slot further comprises one or more entitlements. In some embodiments, the method further comprises providing one or more entitlements assigned to the videoconferencing meeting slot to the participant of the corresponding videoconferencing meeting slot, wherein each entitlement is adjusted based on at least one attribute linked to the corresponding participant. In some embodiments, the method further comprises, responsive to triggering the videoconferencing session, placing the first participant in a virtual waiting room. In yet further embodiments, the method further comprises adjusting the location of one or more other participants within the waiting room based on an adjusted entitlement.

In some embodiments, generating the deep link comprises receiving a participant list comprising a plurality of participants including the first participant, wherein each of the plurality of participants has one or more associated attributes; selecting the first participant based on the first participant's associated attributes; generating a link that has information from the first participant encoded for authentication purposes; publishing the authentication link to the list of participants; receiving, from the first participant, a message including information in the authentication link; authenticating the first participant; and in a case where the identity of the participant is valid, generating and sending the deep link to the first participant. In a case where the identity of the first participant is not valid, the method may further include denying entry to the invalidated participant to the videoconferencing session.

In some embodiments, the videoconferencing space is a 2D videoconferencing environment and each videoconferencing meeting slot represents a tile thereof.

In some embodiments, the videoconferencing space is a 3D virtual environment and each videoconferencing meeting slot represents a precise position including 3D coordinates within that 3D environment. In yet further embodiments, the method comprises receiving, from at least one camera, a live data feed from at least one user of at least one client device; generating, from the live data feed, a user graphical representation corresponding to the first participant; and after receiving information in the deep link from the first participant, inserting the user graphical representation corresponding to the first participant into the position of the 3D virtual environment and graphically combining the user graphical representation with the 3D virtual environment.

In some embodiments, the method further comprises including in the deep link an expiration factor, wherein the expiration factor is one of a session-based, or time-based, or click-based expiration factor, or a combination thereof.

In some embodiments, the method comprises requesting further security authorization requirements including one or more of a password, or a biometric authentication method, or a combination thereof, prior to assigning the first participant to the corresponding videoconferencing meeting slot of the videoconferencing session.

In another aspect of the current disclosure, a system for generating secure deep links comprises at least one server computer comprising at least one processor and memory comprising instructions executed by said at least one processor. The instructions are configured to cause the at least one server computer to: receive a deep link generation request; receive a videoconferencing meeting slot list, wherein a videoconferencing meeting slot in the video conferencing meeting slot list comprises a location within a videoconferencing space; and generate a deep link corresponding to the videoconferencing meeting slot, wherein the deep link is configured to, upon activation, direct a first participant to the location of the videoconferencing meeting slot within the videoconferencing space.

In further embodiments, the instructions are further configured to cause the at least one server computer to: receive a participant list comprising a plurality of participants, wherein each of the plurality of participants has one or more associated attributes; and create a meeting slot protocol by allocating a videoconferencing meeting slot to each of the plurality of participants based on the one or more associated attributes. In further embodiments, the instructions are further configured to cause the at least one server computer to send the deep link to a participant client device; receive a message from the participant client device confirming participation of the first participant on a corresponding videoconferencing session using information in the deep link; trigger the video conferencing session for the first participant; and assign the first participant to the corresponding videoconferencing meeting slot based on a meeting slot protocol.

In some embodiments, each videoconferencing meeting slot further comprises one or more entitlements, wherein the one or more entitlements assigned to the videoconferencing meeting slot are provided to the participant of the corresponding videoconferencing meeting slot. In yet further embodiments, each entitlement is further adjusted based on the at least one attribute linked to the corresponding participant.

In some embodiments, each participant is placed in a virtual waiting room. In yet further embodiments, the location of the participant within the waiting room is selected based on the entitlement that is adjusted according to the at least one attribute linked to the corresponding participant. In some embodiments, the instructions are further configured to cause the at least one server computer to trigger the video conferencing session for the first participant; place the first participant in a virtual waiting room; and adjust the location of one or more other participants within the virtual waiting room based on an adjusted entitlement.

In some embodiments, the instructions are further configured to cause the at least one server computer to: receive a participant list, wherein each participant in the list has one or more associated attributes; select a participant based on the participant's associated attributes; generate an authentication link that has information from the selected participant encoded for authentication purposes; publish the authentication link to the list of participants; receive, from a participant client device, a message including information in the authentication link (e.g., in response to a click on or other activation of the authentication link); authenticate the selected participant; and, in a case where the identity of the selected participant is valid, generate and send the deep link to the selected participant. In some embodiments, in a case where the identity of the selected participant is not valid, instructions are further configured to cause the at least one server computer to deny entry to the invalidated participant to the videoconferencing session.

In some embodiments, the videoconferencing space is a 2D videoconferencing environment and each videoconferencing meeting slot represents a tile thereof. In other embodiments, the videoconferencing space is a 3D virtual environment and each videoconferencing meeting slot represents a position including 3D coordinates within that 3D virtual environment, wherein a user graphical representation generated from live data feed captured by at least one camera is inserted into a 3D coordinate of the 3D virtual environment and is combined therewith. In yet further embodiments, the deep link further encodes an expiration factor, wherein the expiration factor is session-based, time-based, or click-based, or a combination thereof.

In another aspect of the current disclosure, at least one non-transitory computer-readable medium having stored thereon instructions configured to cause at least one server computer comprising a processor and memory to perform steps comprising: receiving a deep link generation request; receiving a videoconferencing meeting slot list, wherein a videoconferencing meeting slot in the videoconferencing meeting slot list comprises a location within a videoconferencing space of a videoconferencing platform; generating a deep link corresponding to the videoconferencing meeting slot, wherein the deep link is configured to, upon activation, direct a first participant to the location of the videoconferencing meeting slot within the videoconferencing space; receiving a participant list comprising a plurality of participants, wherein each of the plurality of participants has one or more associated attributes; creating a meeting slot protocol by allocating a videoconferencing meeting slot to each of the plurality of participants based on the one or more associated attributes of the respective participants; sending, via a network, the deep link to a participant client device; receiving, via the network, a message from the participant client device confirming participation of the first participant on a corresponding videoconferencing session using information in the deep link; triggering the corresponding videoconferencing session for the first participant; and assigning the first participant to the corresponding videoconferencing meeting slot based on the meeting slot protocol.

In another aspect of the current disclosure, a system for generating spatial deep links for virtual spaces comprises at least one server computer comprising at least one processor and memory comprising instructions configured to, when executed by the at least one processor, cause the at least one server computer to: receive a deep link generation request that is triggered when a participant of a videoconferencing session invites an invitee to join the videoconferencing session, wherein the video conferencing session is hosted by a videoconferencing space in a 3D virtual environment; retrieve and encode videoconferencing session context data and a session communication instance; and generate a deep link comprising the encoded videoconferencing session context data. In some embodiments, a videoconferencing platform connected to a deep link generator comprises at least one videoconferencing space hosting the videoconferencing session.

In some embodiments, the context data comprises the 3D coordinates of a user graphical representation of the participant within the 3D virtual environment and the desired 3D coordinates of the invitee. In some embodiments, the desired 3D coordinates of the invitee are restricted to a predefined radius around the participant inviting the invitee. In some embodiments, a videoconferencing platform is configured to insert the user graphical representation of the participant, generated from live data feed captured by at least one camera, into a position defined by 3D coordinates of the 3D virtual environment representing the videoconferencing space and to combine the user graphical representation therewith.

In some embodiments, the instructions are further configured to cause the at least one server computer to: send the deep link to an invitee client device; receive a message from the invitee via the invitee client device, accepting the invitation to the videoconferencing session using information in the deep link (e.g., in response to a click on or other activation of the deep link); and retrieve and position the user graphical representation of the invitee at the 3D coordinates within the 3D virtual environment, granting the invitee access to the videoconferencing session.

In some embodiments, the videoconferencing session is a public videoconferencing session hosted in a public 3D virtual environment in a public communication instance.

In some embodiments, the public 3D virtual environment comprises a plurality of third-party proprietary virtual environments publicly or privately accessible by participants. In further embodiments, the instructions are further configured to cause the at least one server computer to, responsive to a request from the participant, generate a deep link to an invitee configured to position the invitee in a desired 3D coordinate in the private session.

In some embodiments, the videoconferencing session context data further comprises user attributes including user profile data comprising user identification data, spending ranking, and buying preferences.

In some embodiments, a host of a third-party proprietary virtual environment retrieves buyer profile data of a participant entering the third-party proprietary virtual environment via a corresponding user graphical representation and sends a private invitation to the corresponding participant that opens up a private session between the host and the invited participant in a private communication instance.

In another aspect of the current disclosure, a method for generating deep links for virtual spaces comprises receiving, by a computer system, a deep link generation request that is triggered when a participant of a videoconferencing session hosted in a videoconferencing platform invites an invitee to join the videoconferencing session; retrieving and encoding videoconferencing session context data and a session communication instance; and generating a deep link comprising the encoded videoconferencing session context data; wherein the videoconferencing platform comprises at least one videoconferencing space hosting the videoconferencing session, wherein the at least one videoconferencing space comprises a 3D virtual environment.

In some embodiments, the context data comprises 3D coordinates of a user graphical representation of the participant within the 3D virtual environment and desired 3D coordinates of the invitee, wherein the method further comprises restricting the desired 3D coordinates of the invitee to a predefined radius around the participant inviting the invitee.

In some embodiments, the method further comprises encoding in the deep link an expiration factor, wherein the expiration factor is one of a session-based, or time-based, or click-based expiration factor, or a combination thereof.

In some embodiments, the method further comprises inserting, by the videoconferencing platform, a user graphical representation of the participant generated from live data feed captured by at least one camera, into a 3D coordinate of the 3D virtual environment and to combine the user graphical representation therewith. In some embodiments, the method further comprises sending the deep link to an invitee client device; receiving a message from the invitee via the invitee client device, accepting the invitation to the videoconferencing session using information in the deep link (e.g., in response to a click on the deep link by the invitee via the invitee client device); and positioning the user graphical representation of the invitee at the 3D coordinates within the 3D virtual environment, granting the invitee access to the videoconferencing session.

In some embodiments, the videoconferencing session is a public videoconferencing session hosted in a public 3D virtual environment in a public communication instance, wherein the public 3D virtual environment comprises a plurality of third-party proprietary virtual environments publicly or privately accessible by participants. In yet further embodiments, the method further comprises responsive to a request from the participant, generating (e.g., by the host via a deep link generator) a deep link to an invitee that positions the invitee in a desired 3D coordinate in the private session.

In some embodiments, the videoconferencing session context data further comprises user attributes including user profile data comprising user identification data, spending ranking, and buying preferences. In yet further embodiments, a host of a third-party proprietary virtual environment retrieves buyer profile data of a participant entering the third-party proprietary virtual environment via a corresponding user graphical representation and sends a private invitation to the corresponding participant that opens up a private session between the host and the invited participant in a private communication instance.

In another aspect of the current disclosure, at least one non-transitory computer-readable medium has stored thereon instructions configured to cause at least one server computer comprising a processor and memory to perform steps comprising: receiving (e.g., by a deep link generator stored in memory) a deep link generation request that is triggered when a participant of a videoconferencing session hosted in a videoconferencing platform invites an invitee to join the videoconferencing session; retrieving and encoding videoconferencing session context data and a session communication instance; and generating a deep link comprising the encoded videoconferencing session context data; wherein the videoconferencing platform comprises at least one videoconferencing space hosting the videoconferencing session, wherein the at least one videoconferencing space comprises a 3D virtual environment.

In another aspect of the current disclosure, a method enabling distributed deep link security implemented by at least one server computer comprising at least one processor and memory comprises: receiving a deep link generation request; generating a deep link corresponding to a videoconferencing meeting slot of a videoconferencing session, wherein the deep link is configured to, upon activation, direct a participant to a location of the videoconferencing meeting slot within a videoconferencing space; fragmenting the deep link into data fragments, wherein a first data fragment comprises a majority of the data of the deep link and wherein a second data fragment comprises a minority of the data of the deep link; distributing the data fragments of the deep link to at least two different storage locations, wherein the first data fragment is stored in at least a first storage location and wherein the secpmd data fragment is stored in at least a second storage location; generating an assembling link configured to, upon activation, initiate a deep link assembling process that assembles the deep link from the data fragments; and sending the assembling link to an inviter client device.

In some embodiments, the videoconferencing space comprises a 2D videoconferencing environment with each videoconferencing meeting slot representing a tile thereof, or the videoconferencing space comprises a 3D virtual environment and each videoconferencing meeting slot represents a position including 3D coordinates within the 3D virtual environment.

In some embodiments, the deep link assembling process comprises: retrieving, upon validation from the participant, the first data fragment of the deep link from the first storage location and the second data fragment from the second storage location; assembling the first and second data fragments of the deep link; and sending the assembled deep link to grant an invitee access to the videoconferencing session.

In some embodiments, the method further comprises inserting a user graphical representation of the invitee, generated from a live data feed captured by at least one camera, into a 3D coordinate position of a 3D virtual environment. In yet further embodiments videoconferencing session is a public videoconferencing session hosted in a public 3D virtual environment in a public communication instance, or is a private videoconferencing session accessed through a private communication instance.

In some embodiments, the second storage location comprises one or more private user servers or client device local memories. In other embodiments, the second storage location is configured within a distributed ledger network.

In some embodiments, the method further comprises encoding in the deep link an expiration factor, wherein the expiration factor is one of a session-based, or time-based, or click-based expiration factor, or a combination thereof.

In some embodiments, the first storage location comprises the memory of the at least one server computer.

In some embodiments, the method further comprises receiving a videoconferencing meeting slot list, wherein the videoconferencing meeting slot is included in the videoconferencing meeting slot list and comprises the location within the videoconferencing space; receiving a participant list comprising a plurality of participants, wherein each of the participants has one or more associated attributes; and creating a meeting slot protocol by allocating a videoconferencing meeting slot to each of the participants based on the one or more associated attributes of the respective participants. In some embodiments, the method further comprises providing one or more entitlements to each videoconferencing meeting slot; and providing the one or more entitlements to the participant of the corresponding videoconferencing meeting slot.

In another aspect of the current disclosure, a system enabling distributed deep link security comprises at least one server computer comprising at least one processor and memory comprising instructions configured to cause the at least one server computer to: receive a deep link generation request; trigger the generation of a deep link corresponding to a videoconferencing meeting slot of a videoconferencing session; divide the deep link into data fragments, wherein a first data fragment comprises a majority of the data of the deep link and wherein a second data fragment comprises a minority of the data of the deep link; generate an assembling link configured to, upon activation, initiate a deep link assembling process that assembles the deep link from the data fragments; and send the assembling link to an inviter client device.

In some embodiments, the videoconferencing space comprises a 2D videoconferencing environment with each videoconferencing meeting slot representing a tile thereof, or wherein the videoconferencing space comprises a 3D virtual environment with each videoconferencing meeting slot representing a position including 3D coordinates within the 3D virtual environment. In further embodiments, the deep link assembling process comprises retrieving, upon validation from a participant, the first data fragment of the deep link from a first storage location; retrieve the second data fragment of the deep link from a second storage location; assembling the first and second data fragments of the deep link; and granting access to the participant to the videoconferencing session. In yet further embodiments, after granting access to a participant to the videoconferencing session, a videoconferencing platform inserts a user graphical representation of the participant, generated from a live data feed captured by at least one camera, at a 3D coordinate of the 3D virtual environment.

In further embodiments, the videoconferencing session is a public videoconferencing session hosted in a public 3D virtual environment in a public communication instance, or is a private videoconferencing session accessed through a private communication instance.

In some embodiments, the second storage location comprises one or more private user servers or client device local memories. In yet further embodiments, the second storage location is configured within a distributed ledger network. In some embodiments, the first storage location comprises the memory of the at least one server computer.

In some embodiments, the instructions are further configured to cause the at least one server computer to: receive a videoconferencing meeting slot list, wherein the videoconferencing meeting slot is included in the videoconferencing meeting slot list and comprises a location within the videoconferencing space; receive a participant list comprising a plurality of participants, wherein each of the participants has one or more associated attributes; create a meeting slot protocol by allocating a videoconferencing meeting slot to each of the participants based on the one or more associated attributes of the respective participants; provide one or more entitlements to each videoconferencing meeting slot; and provide the one or more entitlements to the participant of the corresponding videoconferencing meeting slot.

In another aspect of the current disclosure, at least one non-transitory computer-readable medium having stored thereon instructions configured to cause at least one server computer comprising a processor and memory to perform steps comprising: receiving a deep link generation request from an administrator entity of a videoconferencing platform; generating a deep link corresponding to a videoconferencing meeting slot of a videoconferencing session of the videoconferencing platform, wherein the deep link is configured to, upon activation, direct a participant to a location of the videoconferencing meeting slot within a videoconferencing space; dividing the deep link into data fragments, wherein a first data fragment comprises a first portion of the data of the deep link and wherein a second data fragment comprises a second portion of the data of the deep link; distributing the data fragments of the deep link to at least two different storage locations, wherein the first data fragment is stored in a first storage location and wherein the second data fragment is stored in a second storage location; and generating an assembling link configured to, upon activation, initiate a deep link assembling process that assembles the deep link from the data fragments; and sending the assembling link a participant client device.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have advantages not specifically recited in the above summary Other features and advantages of the present invention will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where:

FIGS. 8A-8B show a videoconferencing platform comprising a videoconferencing space with a public virtual environment and a plurality of proprietary virtual environments, according to an embodiment.

FIG. 10 shows a method for generating spatial deep links for virtual spaces, according to an embodiment.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

The current disclosure solves at least some of the drawbacks disclosed in the background by a system, method, and computer-readable medium for generating specific secure deep links, a system, method, and computer-readable medium for generating spatial deep links for virtual space, and a system, method, and computer-readable medium enabling distributed deep link security.

Figure 1:
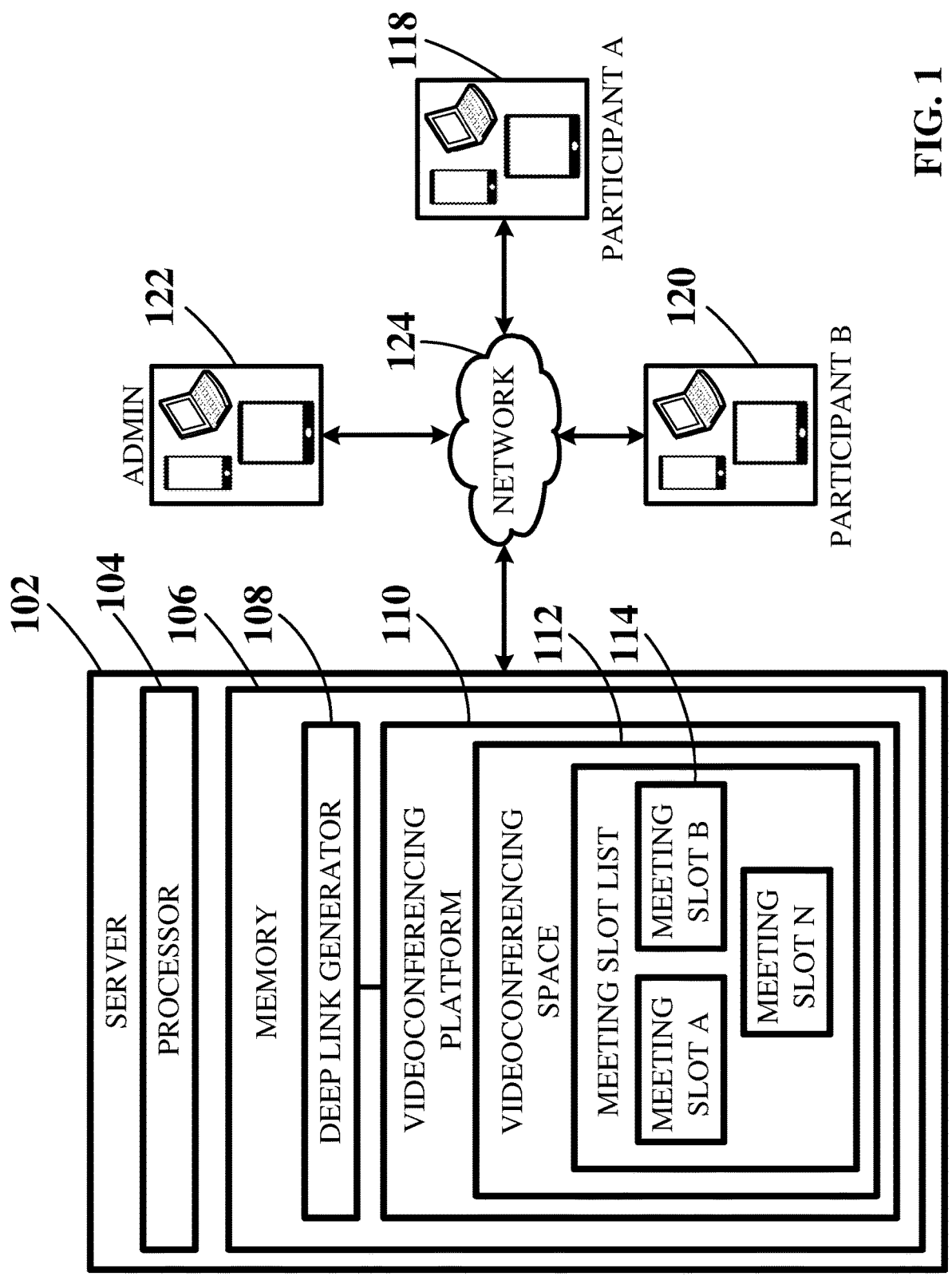
FIG. 1 shows a system for generating secure deep links, according to an embodiment.

FIG. 1 shows a system 100 for generating secure deep links, according to an embodiment.

System 100 comprises at least one server computer 102 of a server computer system comprising at least one processor 104 and memory 106 comprising instructions executed by said at least one processor 104. The memory 106 further stores a deep link generator 108 and a videoconferencing platform 110 comprising at least one videoconferencing space 112. The deep link generator 108 is configured to receive a deep link generation request and receive a videoconferencing meeting slot list, wherein each videoconferencing meeting slot 114 comprises at least a location within the videoconferencing space 112. The deep link generation request may be sent by an administrator of the videoconferencing platform 110 through, for example, an administrator client device 122, or may be automatically created by the videoconferencing platform 110 as people confirm interest in joining a corresponding videoconferencing session.

The deep link generator 108 is further configured to generate a deep link that corresponds to (e.g., is unique for) each videoconferencing meeting slot 114, each deep link including information that represents the location of the videoconferencing meeting slot 114 within the videoconferencing space 112.

In some embodiments of the current disclosure, a deep link comprises a Uniform Resource Locator (URL) that links to a specific part of a videoconferencing space of the videoconferencing platform, such as a videoconferencing meeting slot. The URL may be presented on a computing device in the form of a hyperlink. The URL includes all the information required to point to a particular location of the videoconferencing space. When a videoconferencing session participant clicks on, taps, or otherwise activates a deep link generated by the deep link generator, the participant's client device generates and sends a message (e.g., an HTTP request or a message that uses a different protocol) to a server computer that includes the URL. In this way, the deep link takes the participant to a desired location within the videoconferencing space, such as to a specific meeting slot or a to a specific communication instance.

In some embodiments, the videoconferencing meeting slot 114 to which a participant will be assigned is initially determined by an administrator. In an illustrative scenario, an administrator makes this determination via a graphical user interface, manually clicking on or otherwise selecting a specific place of a layout of a virtual meeting space (e.g., seating positions around a virtual conference table), and place each participant accordingly. Once the locations are selected, and the deep link generator 108 generates respective deep links which direct participants to the corresponding meeting slot, where each deep link is unique to a meeting slot. Alternatively, the videoconferencing meeting slot 114 to which a participant will be assigned is determined automatically (e.g., in a pseudo-random manner) by the system 100 when each user registers, so that when a user clicks on the deep link the user is placed in a position determined automatically by the system 100.

In some embodiments, a communication instance of a videoconferencing session comprises an instance of the videoconferencing space (e.g., of a 2D or 3D virtual environment representing such a video conferencing space) plus one or more corresponding communication channels that enable communications within the videoconferencing space. A public communication instance may be an instance of the videoconferencing space enabling a plurality of users to view each other and to communicate to each other simultaneously. A private communication instance may be an instance of the videoconferencing space enabling communication only to reduced or predetermined number of users upon invitation.

In some embodiments, a user graphical representation graphically represents a user or meeting participant and comprises, e.g., a user 3D virtual cutout constructed from a user-uploaded or third-party-source photo with a removed background, or a user real-time 3D virtual cutout with a removed background generated based on the real-time 2D, stereo, depths or 3D live video stream data feed obtained from the camera, thus comprising the real-time video stream of the user, or a video without removed background, or a video with removed background and displayed utilizing a polygonal structure. Such polygonal structures can be a quad structure or more complex 3D structures used as a virtual frame to support the video. Such user graphical representations may be inserted into three dimensional coordinates within a virtual environment of a 3D videoconferencing space and are therein graphically combined. In the current disclosure, the term "user 3D virtual cutout" refers to a virtual replica of a user constructed from a user-uploaded or third-party-source 2D photo. The user 3D virtual cutout is created via a 3D virtual reconstruction process through machine vision techniques using the user-uploaded or third-party-source 2D photo as input data, generating a 3D mesh or 3D point cloud of the user with removed background. In some embodiments, the data used as input data comprised in the live data feed and/or user-uploaded or third-party-source 2D photo comprises 2D or 3D image data, 3D geometries, video data, media data, audio data, textual data, haptic data, time data, 3D entities, 3D dynamic objects, textual data, time data, metadata, priority data, security data, positional data, lighting data, depth data, and infrared data, amongst others.

In the current disclosure, the term "user real-time 3D virtual cutout" refers to a virtual replica of a user based on the real-time 2D or 3D live video stream data feed obtained from the camera and after having the user background removed. The user real-time 3D virtual cutout is created via a 3D virtual reconstruction process through machine vision techniques using the user live data feed as input data by generating a 3D mesh or 3D point cloud of the user with removed background.

In the current disclosure, the term "video with removed background" refers to a video streamed to a client device, wherein a background removal process has been performed on the video so that only the user may be visible and then displayed utilizing a polygonal structure on the receiving client device.

In the current disclosure, the term "video without removed background" refers to a video streamed to a client device, wherein the video is faithfully representing the camera capture, so that the user and his or her background are visible and then displayed utilizing a polygonal structure on the receiving client device.

The deep link generator 108 is further configured to send deep links to each participant client device 118-120. A participant client device 118-120 may click on or otherwise activate the received link to confirm participation on a corresponding videoconferencing session, which is then sent to the deep link generator 108. The deep link generator 108 receives the authorization to participate in the session from, e.g., the user click, and accordingly initiates the video conferencing session by instructing the videoconferencing platform 110. The deep link generator 108, in communication with the videoconferencing platform 110, then assigns the participant to the corresponding videoconferencing meeting slot 114.

The deep link generator 108 is a computer-generated deep link creator program stored in memory 106 that is configured for generating deep links encoding a plurality of data. For example, the deep link may encode a specific video-conferencing meeting slot from a videoconferencing meeting slot list, so that when the participant clicks on the deep link, the deep link takes the participant to the allocated video conferencing meeting slot 114.

The term "videoconferencing space" refers to a virtual space where a videoconferencing session takes place. The videoconferencing space may be a 2D or a 3D videoconferencing space. In an embodiment where the videoconferencing space is a 2D videoconferencing environment, each videoconferencing meeting slot represents a tile thereof. The meeting slot tiles may be tiles in a matrix, where each tile represents a participant assigned to a specific area within the videoconferencing space and comprises a live-recording or picture of the participant.

In an embodiment where the videoconferencing space is a 3D virtual environment, each videoconferencing meeting slot represents a precise position including 3D coordinates within that 3D virtual environment. The 3D virtual environment is a computer-managed virtual environment supporting real-time communications between participants. As a 3D videoconferencing environment, the virtual environment may comprise other graphical elements not necessarily required for enabling communications, but which may enhance the user experience within the virtual environment. For example, the 3D videoconferencing environment may include a plurality of virtual, graphical elements representing walls, structures and objects within the virtual environment. In some situations, the 3D videoconferencing environment simulates a physical, real-world space. The 3D virtual environment may follow rules related to gravity, topography, physics and kinematics, which may or may not be based on real-world elements, and which may be implemented by suitable computer-implemented mathematical models. In some embodiments, suitable models comprise one or more of a 3D model, dynamic model, geometric model, or a machine learning model, or a combination thereof.

In an embodiment, the deep link generator 108 is configured to encode in a deep link an expiration factor, wherein the expiration factor is session-based, time-based, or click-based (activation-based), or a combination thereof. A session-based expiration factor enables the deep link to be used only for a specific session, deleting or deactivating the deep link after the session is over. A time-based deep link enables a participant using such link to access the videoconferencing session within a predetermined time, after which the deep link may expire. A click-based or activation-based deep link enables using the deep link only a predetermined number of times (e.g., one time, two times, or some other number of times) before deleting or deactivating the deep link. Combinations thereof may also be possible.

Elements of FIG. 1, including the at least one server computer 102 and the various client devices 118-122, may connect through a network 124, such as a wireless network. In some embodiments, the network 124 may include millimeter-wave (mmW) or combinations of mmW and sub 6 GHz communication systems, such as 5th generation wireless systems communication (5G). In other embodiments, the system may connect through wireless local area networking (Wi-Fi). In other embodiments, the system may communicatively connect through 4th generation wireless systems communication (4G), may be supported by 4G communication systems, or may include other wired or wireless communication systems.

Figure 2:
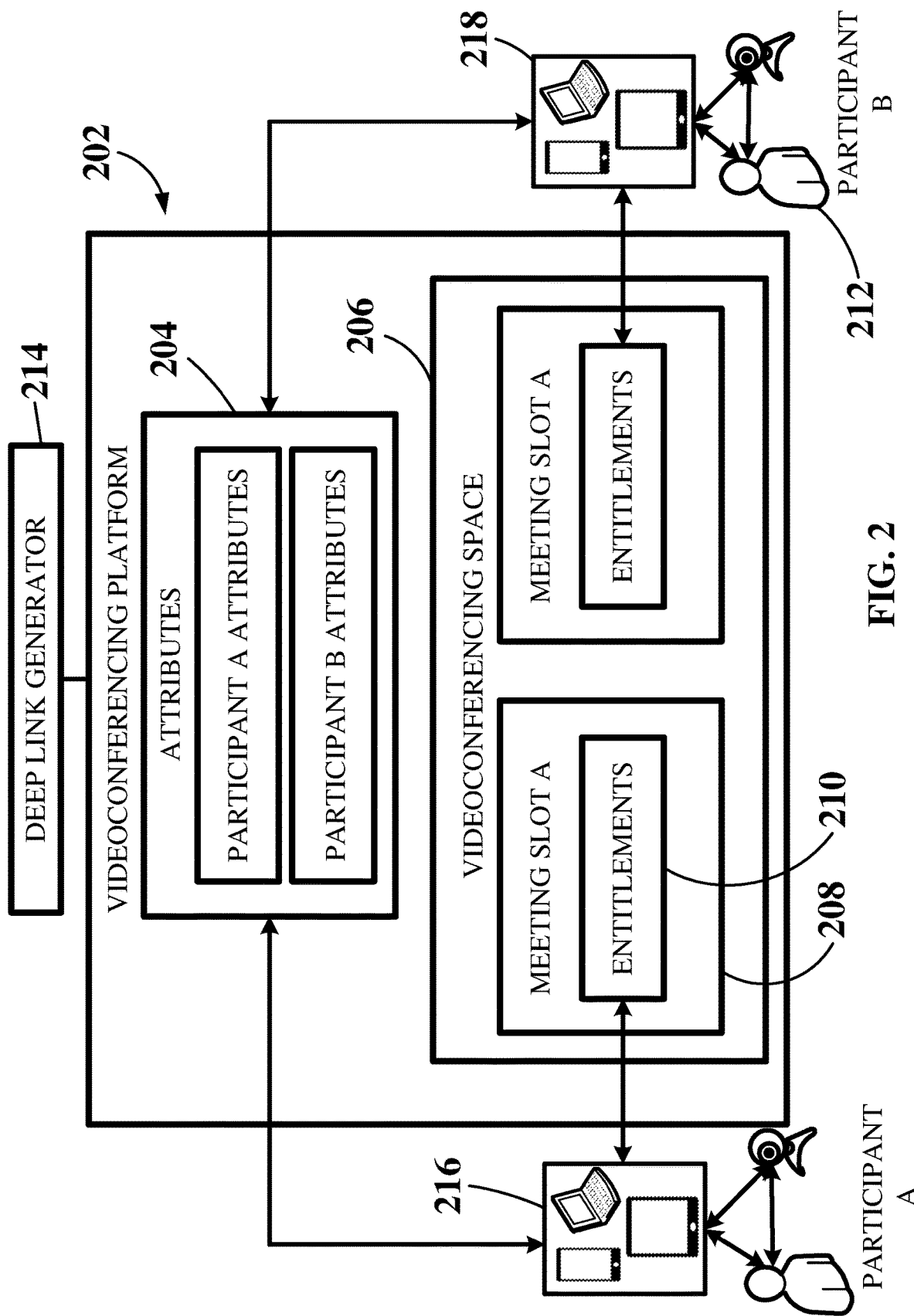
FIG. 2 shows a videoconferencing platform comprising attributes and a videoconferencing space, according to an embodiment.

FIG. 2 shows a videoconferencing platform 202 comprising attributes 204 and a videoconferencing space 206, according to an embodiment.

The videoconferencing space 206 comprises a plurality of meeting slots 208, e.g., meeting slots A and B, each comprising one or more entitlements 210. The entitlements 210 refer to permissions that participants 212 may have when occupying a specific meeting slot 208 that enable a plurality of options within the videoconferencing session.

In some embodiments, the entitlements 210 are provided to the participant of the corresponding videoconferencing meeting slot 208. In one embodiment, the entitlements 210 are provided to the participant 212 before positioning the participant 212 in the corresponding meeting slot 208. In another embodiment, the entitlements 210 are provided to the participant 212 at the moment that the participant is positioned on the meeting slot 208, or afterwards. In certain embodiments, the videoconferencing platform 202 sends the participant terms and conditions that need to be reviewed and approved by the participants for use of the specific entitlements in order to receive said entitlements, before providing the entitlements 210 to the participant 212.

Providing the entitlements to each of the meeting slots 208 and providing a deep link that directs a participant directly to the corresponding meeting slot 208 comprising the entitlements 210, enables increased session security. In situations where the deep link is unique to the meeting slot 208 and is renewed after each session, this decreases the chances of the link being "leaked" or otherwise obtained by an unauthorized user. In a hypothetical case of a deep link being leaked, the deep link may be valid only for a specific meeting slot 208, so only one participant may enter the videoconferencing session in one particular meeting slot 208, simplifying the process of tracking such a leak. This contrasts with most traditional methods, where a single link is generated for the videoconferencing session, increasing the probabilities of the session link being leaked because of the link being the same for multiple participants. Furthermore, providing a deep link corresponding to each meeting slot 208 increases the quality of the user experience by increasing transparency of the positioning within the videoconferencing space 206, as any potential social friction about any of the participants having a wrong meeting slot would be reduced if not eliminated. In some embodiments, a deep link generator 214 connects to the videoconferencing platform 202 and is configured to receive a participant list, wherein each participant has one or more associated attributes 204. Each attribute 204 may represent a specific property, or characteristic, of the participant, such as characteristics related to the user profile, including user identification data, spending ranking, buying preferences, role during the session (e.g., speaker, host, listener, minutes taker, etc.), and the like. The participant list may be input, for example, by an administrator of the videoconferencing platform through, for example, an administrator client device, or may be automatically created by the videoconferencing platform 202 as people confirm interest in joining a corresponding videoconferencing session.

In yet further embodiments, each entitlement 210 is further adjusted based on the at least one attribute 204 linked to the corresponding participant 212. For example, if the entitlements 210 that are assigned to a specific meeting slot comprise muting one participant at a time, and the participant in question comprises an attribute 204 of being a main presenter, then the entitlement 204 of the meeting slot may be adjusted to include enabling muting all participants at the same time.

The deep link generator 214 may be further configured to create a meeting slot protocol by allocating a videoconferencing meeting slot 208 to each participant based on the one or more attributes 204. In an embodiment, a meeting slot protocol includes the list of participants and the order of seating in the videoconferencing space 206 along with the corresponding attributes 204 of each meeting slot 208. The deep link generator 214 (which may specify the meeting slot protocol in the corresponding deep link) creates a deep link that corresponds to each meeting slot 214 based on said meeting slot protocol. For example, a VIP participant (e.g., a speaker, a president, or anyone with a special status for a specific videoconferencing session) may be a assigned a priority meeting slot 208, e.g., meeting slot A, that enables more entitlements than other meeting slots 208, e.g., meeting slots B and C, wherein meeting slot A enables administrator entitlements such as muting other participants' microphones or enables having a higher resolution image or bigger meeting slot tile than the other participants. The deep link generator 214 may be further configured to send deep links to each participant client device 216-218; receive a notification of a click on the deep link or other activation of the deep link from a participant confirming participation on a corresponding videoconferencing session; trigger the videoconferencing session; and assign the participant to the corresponding videoconferencing meeting slot based on the meeting slot protocol.

In one embodiment, the deep link generator 214 is further configured to: receive a participant list, wherein each participant comprises one or more associated attributes; select a participant based on the associated attributes; generate a link that has information from the selected participant encoded for authentication purposes; publish the link to the list of participants; receive, from a participant, a click on or other activation of the link; authenticate the participant; in a case where the identity of the participant is valid, generate and send a deep link to the participant; and in a case where the identity of the participant is not valid, deny entry to the invalidated participant to the videoconferencing session. In this embodiment, the participants from the participant list may be users of the videoconferencing platform, and the link that is generated by the deep link generator 214 may be a link that is designated for one specific participant based on the participant attributes but may nevertheless be visible to all other users. The deep link generator 214, upon authenticating the user to which the link is destined, automatically generates a deep link that places the participant in the corresponding meeting slot. The authentication may take any suitable form, e.g., biometric scanning, including face scanning, fingerprint scanning, voice recognition, and the like; password; PIN; or combinations thereof.

In some embodiments, each participant is placed in a virtual waiting room. The virtual waiting room is a virtual space where participants may be placed while the administrator of the videoconferencing session allows the participants into the session, such as after verifying their identities. Waiting rooms may increase videoconferencing security by preventing intruders to join a videoconferencing session and potentially hijack the meeting or disrupt the experience. In some embodiments, the waiting room may be a virtual environment where waiting participants may interact before joining the actual session for which they may have registered. For example, in the case of a 3D videoconferencing space, the waiting room may be a 3D room with virtual chairs, where each user may be assigned to a corresponding chair. In the case of a 2D videoconferencing space, the virtual environment may comprise a plurality of tiles, each tile assigned to a corresponding participant that is placed in the waiting room. In some embodiments, the location of the participant within the waiting room is selected based on the entitlement that is adjusted according to at least one attribute linked to the corresponding participant.

Figure 3:
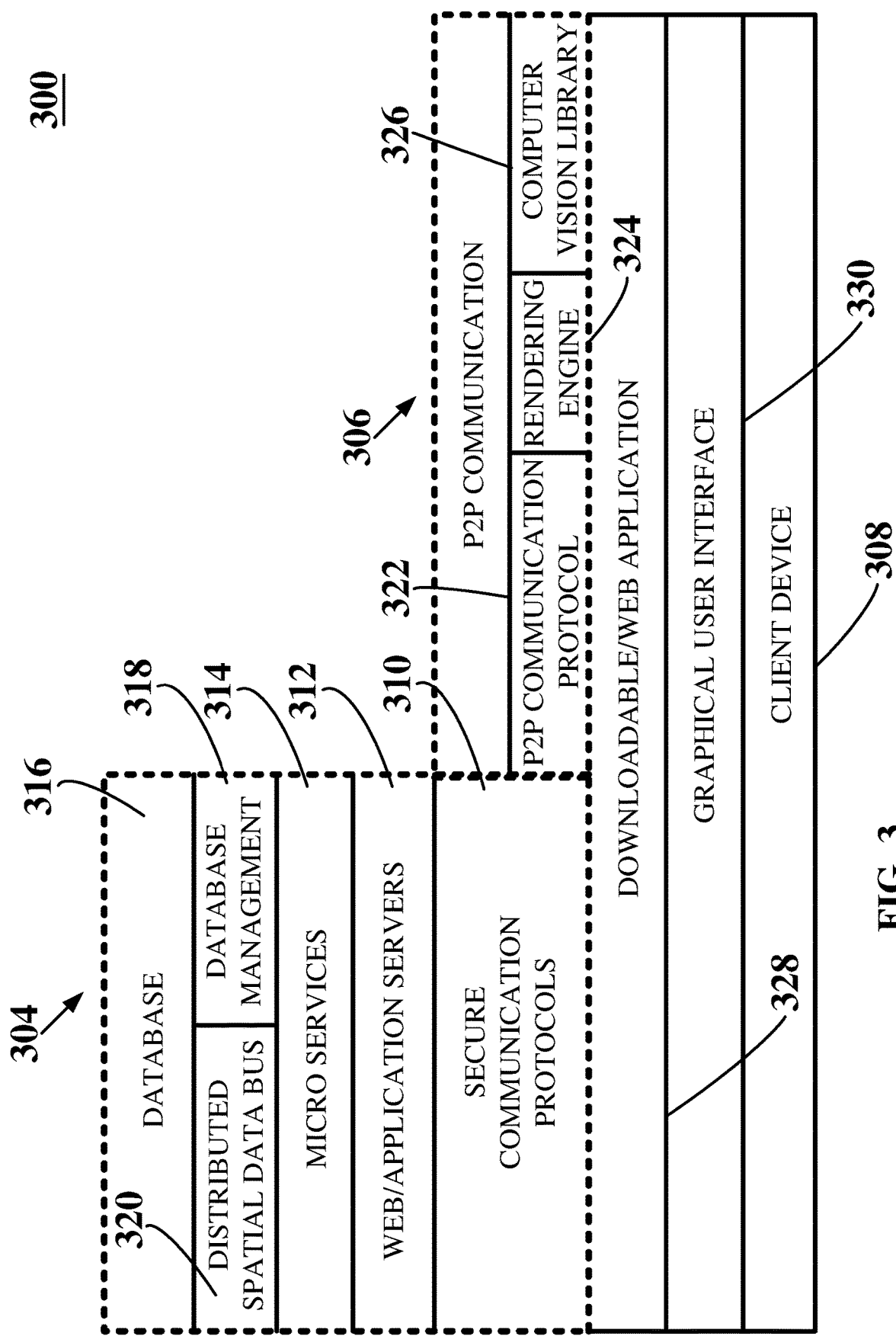
FIG. 3 shows an example of an architecture that may be used by the system for generating secure deep links, according to an embodiment.

FIG. 3 depicts a schematic representation of a sample hybrid system architecture 300 that may be employed in a system for generating secure deep links, according to an embodiment.

The hybrid system architecture 300 is, in some embodiments, a hybrid model of communication for interacting with other peer clients (e.g., other attendees), comprising a client-server side 304 and a P2P side 306, each delimited in FIG. 3 by a dotted area. Using such a hybrid model of communication may enable rapid P2P communications between users reducing latency problems while providing web services, data and resources to each session, enabling a plurality of interactions between users and with content in the videoconferencing space.

In various embodiments, the level and ratio of usage of the client-server side 304 with respect to the P2P side 306 depend on the amount of data to be processed, the latency permitted to sustain a smooth user experience, the desired quality of service (QOS), the services required, and the like. In one embodiment, the P2P side 306 is used for video and data processing, streaming and rendering. This mode of employing the hybrid system architecture 300 may be suitable, for example, when a low latency and low amounts of data need to be processed, and when in the presence of "heavy" clients, meaning that client devices 308 comprise sufficient computing power to perform such operations. In another embodiment, a combination of the client-server side 304 and P2P side 306 is employed, such as the P2P side 306 being used for video streaming and rendering while the client-server side 304 is used for data processing. This mode of employing the hybrid system architecture 300 may be suitable, for example, when there is a high amount of data to be processed or when other micro-services may be required. In yet further embodiments, the client-server side 304 may be used for video streaming along with data processing while the P2P side 306 is used for video rendering. This mode of employing the hybrid system architecture 300 may be suitable, for example, when there is an even higher amount of data to be processed and/or when only a thin client is available. In yet further embodiments, the client-server side 304 may be used for video streaming, rendering and data processing. This mode of employing the hybrid system architecture 300 may be suitable when a very thin client is available. The hybrid system architecture 300 may be configured for enabling alternating between the different modalities of usage of both the client-server side 304 and the P2P side 306 within the same session, as required.

In some embodiments, the at least one cloud server from the client-server side 304 may be an intermediary server, meaning that the server is used to facilitate and or optimize the exchange of data between client devices 308. In such embodiments, the at least one cloud server may manage, analyze, process and optimize incoming image and multimedia streams and manage, assess, optimize the forwarding of the outbound streams as a router topology (for example but not limited to SFU (Selective Forwarding Units), SAMS (Spatially Analyzed Media Server), multimedia routers, and the like), or may use an image and media processing server topology (for example but not limited for decoding, combining, improving, mixing, enhancing, augmenting, computing, manipulating, encoding) or a forwarding server topology (for example but not limited to MCU, cloud media mixers, cloud 3D renderer, media server), or other server topologies.

In such embodiments, where the intermediary server is a SAMS, such media server manages, analyze and processes incoming data of each sending client device 308 (including but not limited to meta-data, priority data, data classes, spatial structure data, three dimensional positional, orientation or locomotion information, image, media, scalable video codec based video), and in such analysis optimizes the forwarding of the outbound data streams to each receiving client device 308 by modifying, upscaling or downscaling the media for temporal (e.g., varying frame rate), spatial (e.g., different image size), quality (e.g., different compression or encoding based qualities) and color (e.g., color resolution and range) based on the specific receiving client device user's spatial, three dimensional orientation, distance and priority relationship to such incoming data achieving optimal bandwidths and computing resource utilizations for receiving one or more user client devices 308.

In some embodiments, the media, video and data processing comprise one or more further encoding, transcoding, decoding spatial or 3D analysis and improvements comprising image filtering, computer vision processing, image sharpening, background improvements, background removal, foreground blurring, eye covering, pixilation of faces, voice-distortion, image uprezzing, image cleansing, bone structure analysis, face or head counting, object recognition, marker or QR, code-tracking, eye tracking, feature analysis, 3D mesh or volume generation, feature tracking, facial recognition, SLAM tracking and facial expression recognition or other modular plugins in form of microservices running on such media router or servers.

The client-server side 304 employs secure communication protocols 310 to enable a secure end-to-end communication between the client device 308 and web/application servers 312 over a network. Sample suitable secure communication protocols 310 may comprise, for example, Datagram Transport Layer Security (DTLS) which is a secure user datagram protocol (UDP) in itself, Secure Realtime Transport Protocol (SRTP), Hypertext Transfer Protocol Secure (https://) and WebSocket Secure (wss://), which are compatible with each other and may provide full duplex authenticated application access, protection of privacy and integrity of exchanged data in transit. Suitable web/application servers 312 may comprise, for example, Jetty web application servers, which are Java HTTP web servers and Java Servlet containers, enabling machine to machine communications and a proper deployment of web application services. The web/application servers 312 may be accessed through the client devices 308 via a corresponding downloadable/web application 328 through a graphical user interface 330.

Although the web/application servers 312 are depicted as a single element in FIG. 3, those skilled in the art may appreciate that the web servers and application servers may be separate elements. For example, the web servers may be configured to receive client requests through the secure communication protocols 310 and route the requests to the application servers. The web/application servers 312 may thus receive the client requests using the secure communication protocols 310 and process the requests, which may comprise requesting one or more micro-services 314 (e.g., Java-based micro-services) and/or looking data up from a database 316 using a corresponding database management system 318. The application/web servers 312 may provide session management and numerous other services such as 3D content and application logic as well as state persistence of sessions (e.g., for persistently storing shared documents, synchronizing interactions and changes in the virtual environment, or persisting the visual state and modifications of a virtual environment). A suitable database management system 318 may be, for example, an object-relational mapping (ORM) database management system, which may be appropriate for database management using open-source and commercial (e.g., proprietary) services given ORM's capability for converting data between incompatible type systems using object-oriented programming languages. In further embodiments, a distributed spatial data bus 320 may further be utilized as a distributed message and resource distribution platform between micro-services and client devices by using a publish-subscribe model.

The P2P side 306 may use a suitable P2P communication protocol 322 enabling real-time communication between peer client devices 308 in the virtual environment through suitable application programming interfaces (APIs), enabling real-time interactions and synchronizations thereof, allowing for a multi-user collaborative environment. For example, through the P2P side 306, contributions of one or more users may be directly transmitted to other users, which may observe, in real-time, the changes performed. An example of a suitable P2P communication protocol 324 may be a Web Real-Time Communication (WebRTC) communication protocol, which is collection of standards, protocols, and JavaScript APIs, which, in combination, enable P2P audio, video, and data sharing between peer client devices 308. Client devices 308 in the P2P side 306 may perform real-time 3D rendering of the live session employing one or more rendering engines 324. An example of a suitable rendering engine 324 may be 3D engines based on WebGL, which is a JavaScript API for rendering 2D and 3D graphics within any compatible web browser without the use of plug-ins, allowing accelerated usage of physics and image processing and effects by one or more processors of the client device 308 (e.g., one or more graphic processing units (GPUs)). Furthermore, client devices 308 in the P2P side 306 may perform image and video-processing and machine-learning computer vision techniques through one or more suitable computer vision libraries 326. In one embodiment, the image and video-processing performed by the client devices 308 in the P2P side 306 comprises the background removal process used in the creation of the user graphical representation previous to the insertion of the user graphical representation into a virtual environment, which may be performed either in real-time or almost real-time on received media streams or in non-real-time on, for example, a photo. An example of a suitable computer vision library 326 may be OpenCV, which is a library of programming functions configured mainly for real-time computer vision tasks.

Figure 4A:
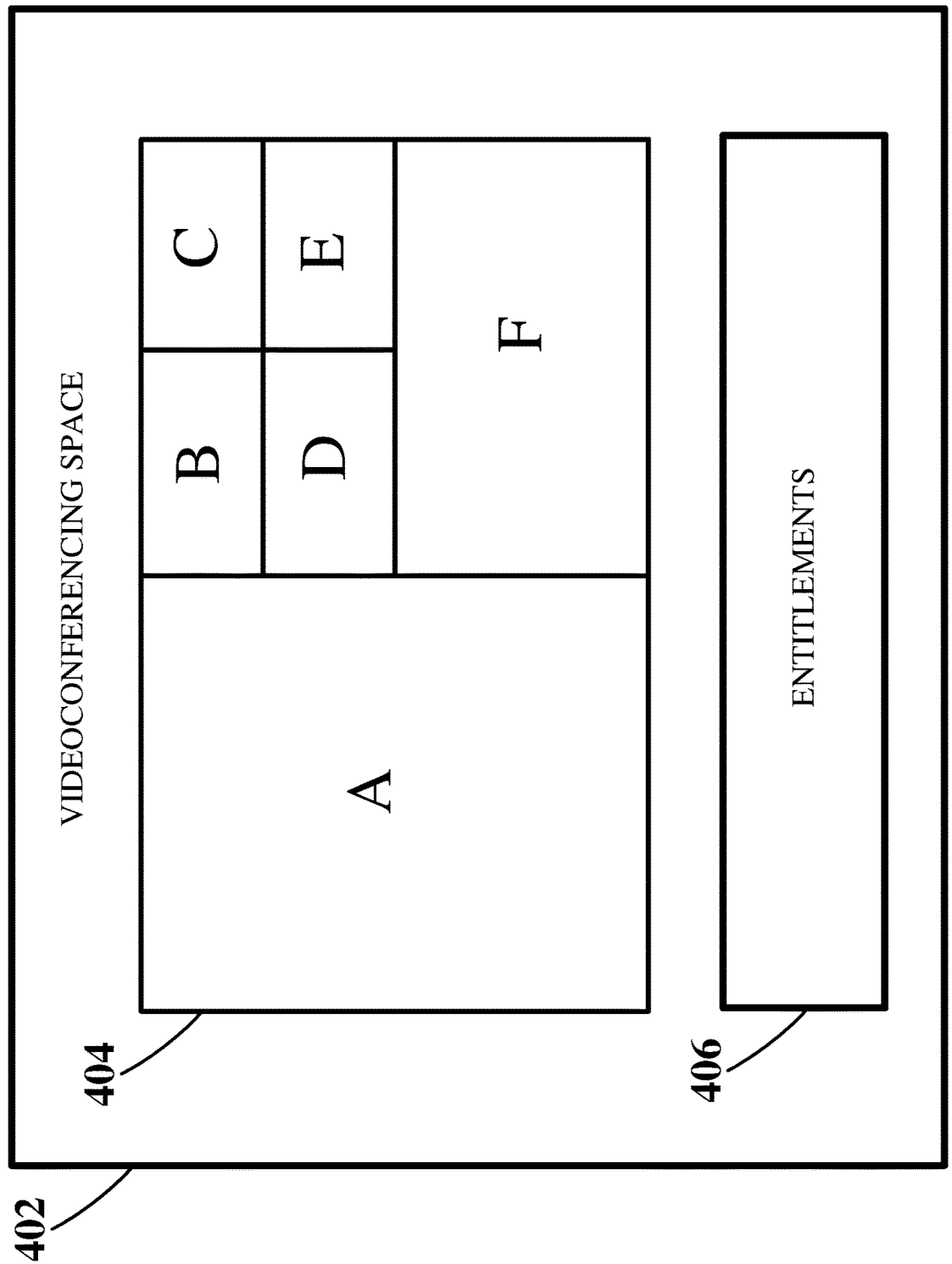
FIGS. 4A-4B show two and 3D videoconferencing spaces, respectively, according to an embodiment.
Figure 4B:
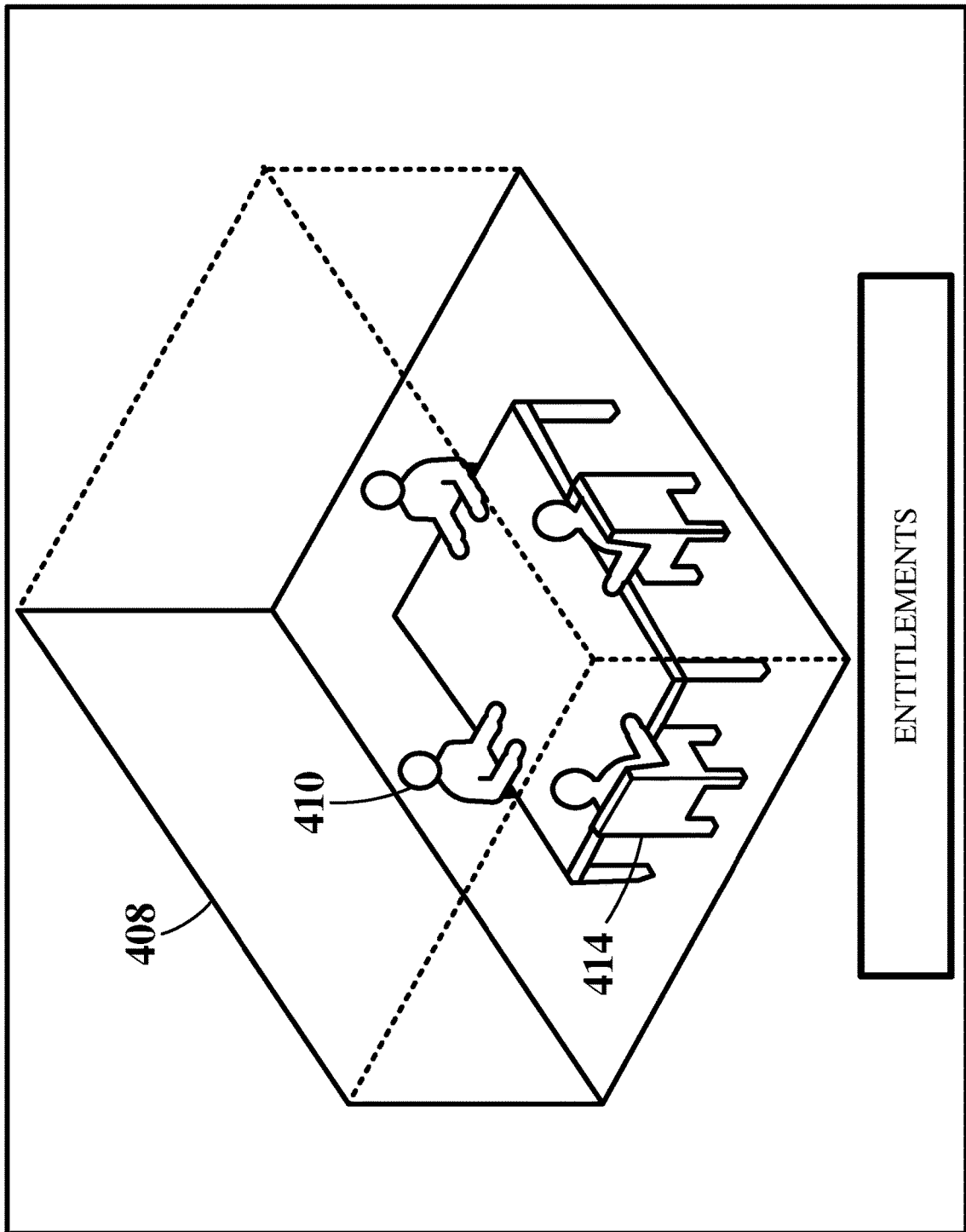

FIGS. 4A-4B show 2D and 3D videoconferencing spaces, respectively, according to an embodiment.

With reference to FIG. 4A, a 2D videoconferencing space 402 comprises a plurality of tiles 404, such as tiles A-F, wherein each tile 404 represents a place within the 2D videoconferencing space 402 that has been assigned to a particular user. Thus, a deep link of the current disclosure may, upon being clicked by a participant, bring the participant directly to the correspondingly assigned tile. Each tile 404 further is assigned a plurality of entitlements 406, in such a way that a participant attending a videoconferencing session hosted in the 2D videoconferencing space 402 can make use of such entitlements. In some embodiments, some of the entitlements comprise providing a larger tile and/or higher resolution to a specific meeting slot and thus to the corresponding participant assigned to such a meeting slot. In the example embodiment of FIG. 4A, tile A is larger than tiles B-F, and therefore, a participant such as a VIP or a main speaker may be assigned to such a tile. Tile F is the second largest tile, and may be assigned to, for example, an assistant, co-speaker or co-host. The remaining tiles B-E may be assigned to listeners of the videoconferencing session not having special tile-size entitlements. As another example of an entitlement, participants may be allocated a tile in a location close to the speaker, which may be useful in situations where many (e.g., hundreds or thousands) of participants may be part of a videoconferencing session.

With reference to FIG. 4B, a 3D videoconferencing space 408 comprises a plurality of participant user graphical representations 410 sitting on a conferencing table 412, each participant user graphical representations 410 sitting on a 3D seat 414 that represents a corresponding meeting slot. Thus, a deep link of the current disclosure may, upon being clicked by a participant, bring the participant directly to the correspondingly assigned seat. Each 3D seat 414 is further assigned a plurality of entitlements 406, in such a way that a participant attending a videoconferencing session hosted in the 3D videoconferencing space 408 can make use of such entitlements 406. As another example of an entitlement in a 3D video conferencing space 408, participants may be allocated a 3D seat 414 in a location close to the speaker.

In an example application, a coworking space may have a plurality of 3D videoconferencing spaces 408, each representing a meeting slot. A plurality of participants may request participation in the videoconferencing session to an administrator (e.g., by confirming an invitation or requesting access through the videoconferencing platform). The administrator may send a deep link generation request to the deep link generator, which creates a deep link comprising the meeting slot position assigned to each participant. The deep link generator sends a deep link to each participant, which, after validation from the participant by clicking on the deep link, initiates the videoconferencing session by instructing the videoconferencing platform accordingly. The deep link generator, in communication with the videoconferencing platform, then assigns the participant to the corresponding videoconferencing meeting slot within the coworking space based on the encoded meeting slot information. Participants within the coworking space may thus be "spawned" by inserting their corresponding graphical representations or avatars within the videoconferencing session in a specific 3D coordinate where the meeting slot may be located. The meeting slots may comprise one or more entitlements that may be provided to each participant. The deep link generator may be further configured to receive a participant list, wherein each participant comprises one or more attributes. Each entitlement may further be adjusted based on the at least one attribute linked to the corresponding participant. Participants may thus have special entitlements based on the meeting slot that has been assigned, alternatively, on a combination of the meeting slot entitlement and their own attributes. Similar examples may apply to applications on virtual events that may be hosted on a videoconferencing platform of the current disclosure, including but not being limited to political speeches, concerts, theater plays, comedy shows, conferences, learning (e.g., virtual schools), karaokes, and the like. Participants may be enabled to engage in a plurality of interactions with each other, as described in FIG. 5 below.

Figure 5:
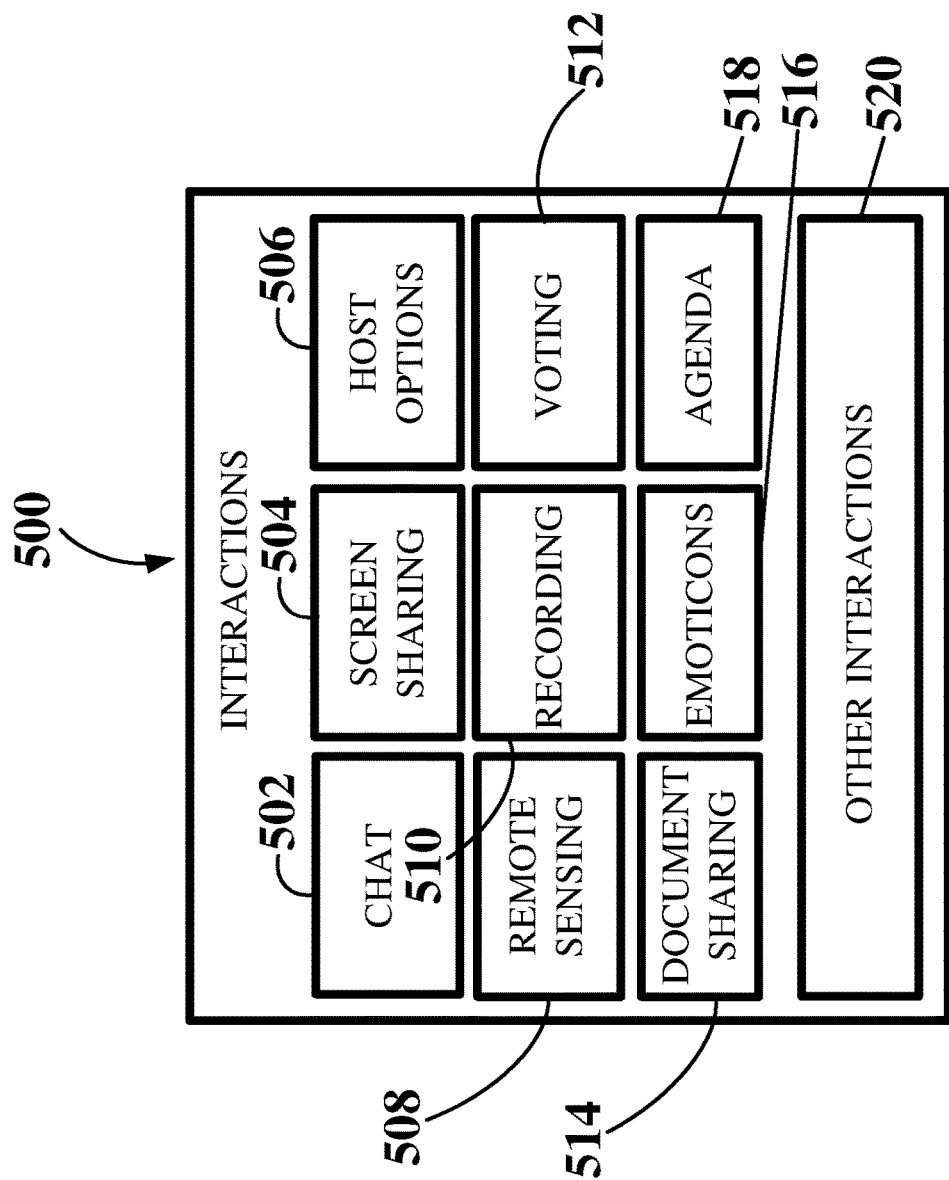
FIG. 5 shows examples of interactions that users may engage on depending on their adjusted entitlements, according to an embodiment.

FIG. 5 shows examples of interactions 500 that users may engage on depending on their adjusted entitlements, according to an embodiment.

Such interactions 500 may include, for example, chatting 502, screen sharing 504, host options 506, remote sensing 508, recording 510, voting 512, document sharing 514, emoticon sending 516, agenda sharing and editing 518, or other interactions 520. The other interactions 520 may comprise, for example virtually hugging, hand-raising, hand-shaking, walking, content adding, meeting-summary preparation, object moving, projecting, laser-pointing, game-playing, purchasing and other social interactions facilitating exchange, competition, cooperation, resolution of conflict between users. The various interactions are described in more detail below. When the videoconferencing space is a 2D videoconferencing space, the entitlements may further comprise an increased resolution and/or tile size allocated to the particular meeting slot 208, for example.

Chatting 502 may open up a chat window enabling sending and receiving textual comments and on-the-fly resources. Screen sharing 504 may enable to share in real-time the screen of a user to any other participants. Host options 506 are configured to provide further options to a conversation host, such as muting one or more users, inviting or removing one or more users, ending the conversation, and the like. Remote sensing 508 enables viewing the current status of a user, such as being away, busy, available, offline, in a conference call, or in a meeting. The user status may be updated manually through the graphical user interface or automatically through machine vision algorithms based on data obtained from the camera feed. Recording 510 enables recording audio and/or video from the conversation. Voting 512 enables to provide a vote for one or more proposals posted by any other participant. Through voting 512, a voting session can be initiated at any time by the host or other participant with such a permission. The subject and choices may be displayed for each participant. Depending on the configuration of the voting interaction, at the end of a timeout period or at the end of everyone's response the results may be shown to all the attendees. Document sharing 514 enables to share documents in any suitable format with other participants. These documents may also be persisted permanently by storing them in persistent memory of the one or more cloud server computers and may be associated with the virtual environment where the virtual communication takes place. Emoticon 516 sending enables sending emoticons to other participants. Agenda sharing and editing 518 enables sharing and editing an agenda that may have been prepared by any of the participants. In some embodiments, a checklist of agenda items may be configured by the host ahead of the meeting. The agenda may be brought to the foreground at any time by the host or other participants with such a permission. Through the agenda-editing option, items can be checked off as a consensus is reached or may be put off.

The other interactions 520 provide a non-exhaustive list of possible interactions that may be provided in the virtual environment depending on the virtual environment vertical. Hand-raising enables raising the hand during a virtual communication or meeting so that the host or other participants with such an entitlement may enable the user to speak. Walking enables moving around the virtual environment through the user real-time 3D virtual cutout. Content adding enables users to add interactive applications or static or interactive 3D assets, animations or 2D textures to the virtual environment. Meeting-summary preparation enables an automatic preparation of outcomes of a virtual meeting and distributing such outcomes to participants at the end of the session. Object moving enables moving objects around within the virtual environment. Projecting enables projecting content to a screen or wall available in the virtual environment from an attendee's screen. Laser-pointing enables pointing a laser in order to highlight desired content on a presentation. Game-playing enables playing one or more games or other types of applications that may be shared during a live session. Purchasing enables making in-session purchases of content. Other interactions not herein mentioned may also be configured depending on the specific use of the virtual environment platform.

Figure 6:
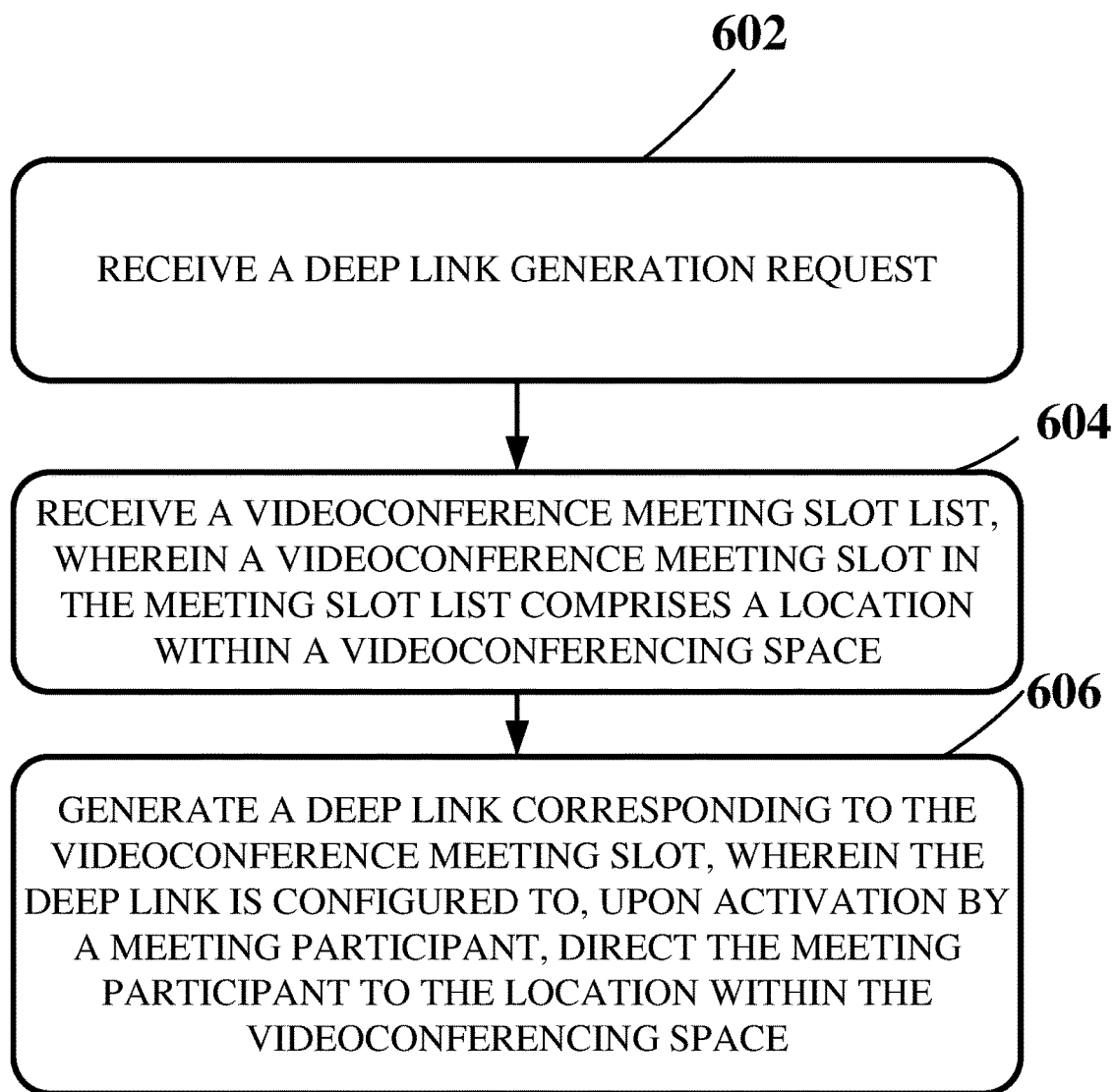
FIG. 6 shows a method for generating secure deep links, according to an embodiment.

FIG. 6 shows a method 600 for generating secure deep links. Method 600 may be implemented by at least one computer of a computer system comprising at least one processor and memory comprising instructions configured for performing the steps of method 600. Method 600 begins in step 602 by receiving, by a deep link generator stored in memory, a deep link generation request. The deep link generation request may be sent by an administrator of the videoconferencing platform through, for example, an administrator client device, or may be automatically created by the videoconferencing platform as people confirm interest in joining a corresponding videoconferencing session. In step 604, the method 600 continues by receiving a videoconferencing meeting slot list, wherein a videoconferencing meeting slot in the list comprises at least a location within a videoconferencing space of a videoconferencing platform. In step 606, the method 600 ends by generating a deep link that corresponds to (e.g., is unique for) the videoconferencing meeting slot, the deep link includes information representing at least the location of the videoconferencing meeting slot within the videoconferencing space. The deep link is configured to, upon activation by a meeting participant, direct the meeting participant to the location within the videoconferencing space. The information representing the location may be, e.g., coordinates for a particular meeting slot, a numeric or alphanumeric code that can be used to look up coordinates for a particular meeting slot, or some other representative information.

In some embodiments, the method 600 further comprises receiving a participant list, wherein each participant in the participant list comprises one or more attributes linked to the corresponding participant. Each attribute may represent a specific property, or characteristic, of the participant, such as characteristics related to the user profile, including user identification data, spending ranking, buying preferences, role during the session (e.g., speaker, host, listener, minutes taker, etc.), and the like. The participant list may be input, for example, by an administrator of the videoconferencing platform through, for example, an administrator client device, or may be automatically created by the videoconferencing platform as people confirm interest in joining a corresponding videoconferencing session.

In some embodiments, the method 600 further comprises creating a meeting slot protocol by allocating a videoconferencing meeting slot to each participant based on the one or more attributes. The meeting slot protocol includes, in some embodiments, the list of participants and the order of seating in the videoconferencing space along with the corresponding attributes of each meeting slot. The deep link generator may encode the meeting slot protocol in the corresponding deep link and create a deep link that corresponds to each meeting slot based on said meeting slot protocol.

In some embodiments, the method 600 further comprises sending deep links to each participant client device; receiving a notification of a click on or other activation of the deep link from a participant confirming participation on a corresponding videoconferencing session, confirming participation in said videoconferencing session; triggering the video conferencing session; and assigning the participant to the corresponding videoconferencing meeting slot based on the meeting slot protocol.

Figure 7:
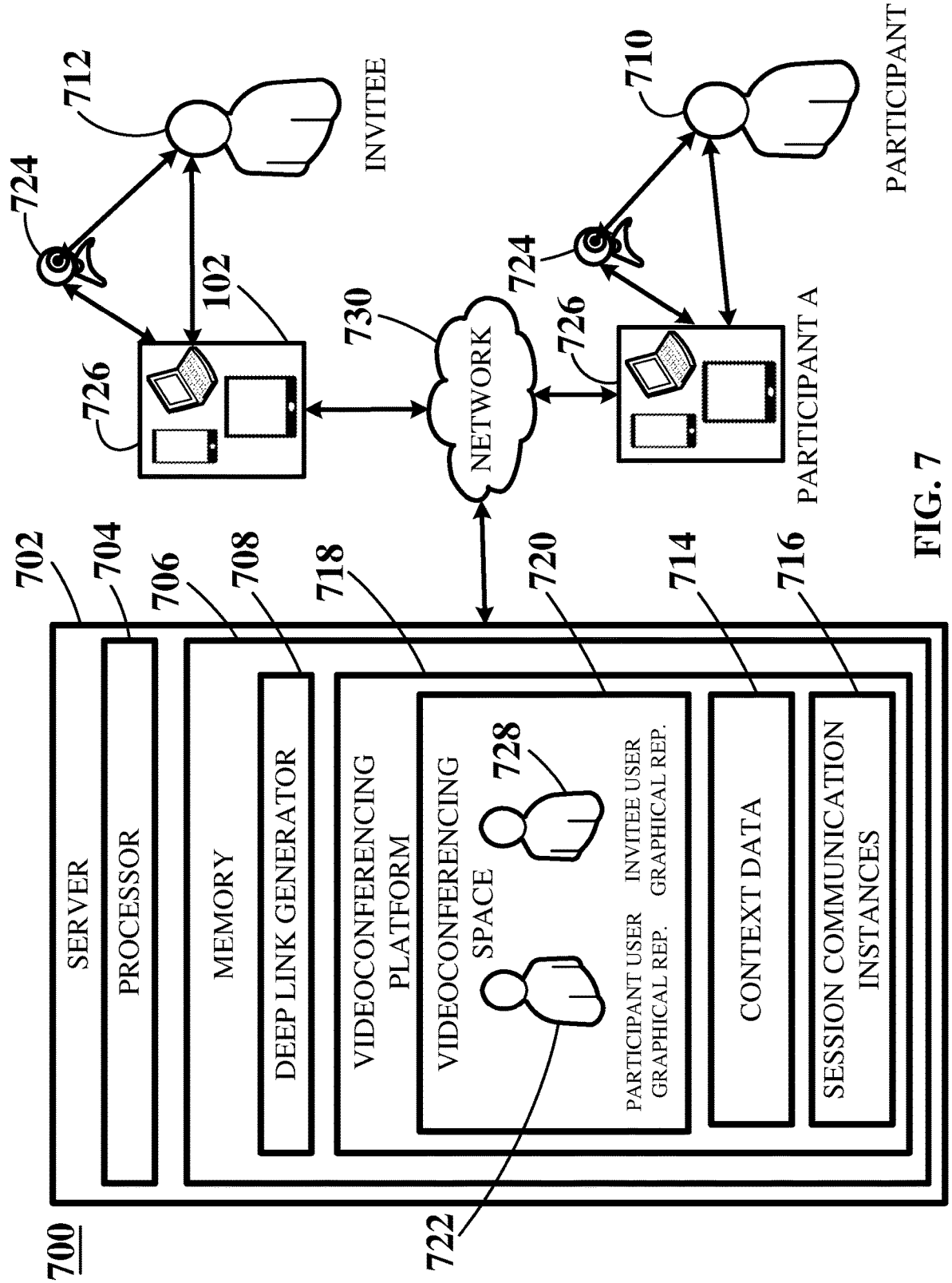
FIG. 7 shows a system for generating spatial deep links for virtual spaces, according to an embodiment.

FIG. 7 shows a system 700 for generating spatial deep links for virtual spaces, according to an embodiment.

The system 700 comprises at least one server computer 702 of a server computer system comprising at least one processor 704 and memory 706 storing instructions executed by said at least one processor 704 to implement a deep link generator 708 configured to receive a deep link generation request that is triggered when a participant 710 of a videoconferencing session invites an invitee 712 to join the videoconferencing session. The deep link generator 708 is further configured to retrieve videoconferencing session context data 714 and a session communication instance 716 corresponding to the specific session to which the participant takes part; and to generate a deep link comprising an encoded representation of the videoconferencing session context data 714. The instructions further implement a videoconferencing platform 718 connected to the deep link generator 708 comprising at least one videoconferencing space 720 hosting the videoconferencing session, wherein the at least one videoconferencing space 720 is a 3D virtual environment. The context data 714 and session communication instances 716 may be part of the videoconferencing platform 718. The 3D virtual environment may comprise characteristics as described with reference to FIG. 1. The context data 714 videoconferencing platform 718.

In one embodiment, the context data 714 comprises the 3D coordinates of a user graphical representation 722 of the participant 710 within the 3D virtual environment and the desired 3D coordinates of the invitee 712. In yet further embodiments, the desired 3D coordinates of the invitee 712 are restricted to a predefined radius around the participant 710 inviting the invitee 712. In yet further embodiments, the context data 714 comprises user attributes including user profile data including user identification data, spending ranking, and buying preferences.

In some embodiments, the videoconferencing platform 718 is configured to insert the user graphical representation 722 of corresponding participants 710, generated from a live data feed captured by at least one camera 724, into a 3D coordinate position of the videoconferencing space 720 and to combine the user graphical representation 722 therewith. The 3D virtual environment may comprise characteristics as described with reference to FIG. 1. In yet further embodiments, the deep link generator 708 is configured to send the deep link to an invitee client device 726; receive a message or other notification of a click on or other activation of the deep link by the invitee 712 via the invitee client device 726, accepting the invitation to the videoconferencing session; and retrieve and position the user graphical representation 728 of the invitee 712 into the precise 3D coordinates within the 3D virtual environment, granting the invitee 712 access to the videoconferencing session.

For example, a participant 710 may invite an invitee 712 to participate in a videoconferencing session within a videoconferencing space 720. The deep link generator 708 receives the deep link generation request and encodes videoconferencing session context data 714 and a session communication instance 716 corresponding to the specific session to which the participant 710 takes part, information which is then included in the deep link that is generated by the deep link generator 708. The context data 714 comprises the 3D coordinates of the user graphical representation 722 of the participant 710 within the 3D virtual environment and the desired 3D coordinates of the invitee 712. The participant 710 may be present within the videoconferencing space 718 through a user graphical representation 722 generated from live feed data captured by at least one camera 724 and which is inserted by the videoconferencing platform 718 into a 3D coordinate of the videoconferencing space 720 and combines the user graphical representation 722 therewith. In one example, the participant 710 invites the invitee 712 in such a manner that the deep link includes a 3D coordinate set that positions the invitee 712, through a corresponding invitee user graphical representation 726, in a position that is close to that of the participant user graphical representation 722, because the desired 3D coordinates of the invitee 712 may be restricted to a predefined radius around the participant 710 inviting the invitee 712. Thus, the participant 710 may originally visit an area of the 3D virtual environment of the videoconferencing space 718 and, upon finding an area of interest of the 3D virtual environment, may decide to invite a friend to come and join him or her to enjoy that area of interest, for which the participant 710 sends a deep link that brings the invitee 712 directly in the vicinity of the participant 710, e.g., in front of the participant.

The participant 710 and invitee 712 may use client devices 726 comprising, for example, computers, headsets, mobile phones, glasses, transparent screens, tablets and generally input devices with cameras built-in or which may connect to cameras and receive data feed from said cameras. The client devices 726 may connect to each other and to the server 702 through a network 730.

In an embodiment, the deep link generator 708 is configured to encode each deep link an expiration factor, wherein the expiration factor is session-based, time-based, or click-based, or a combination thereof.

Figure 8A:
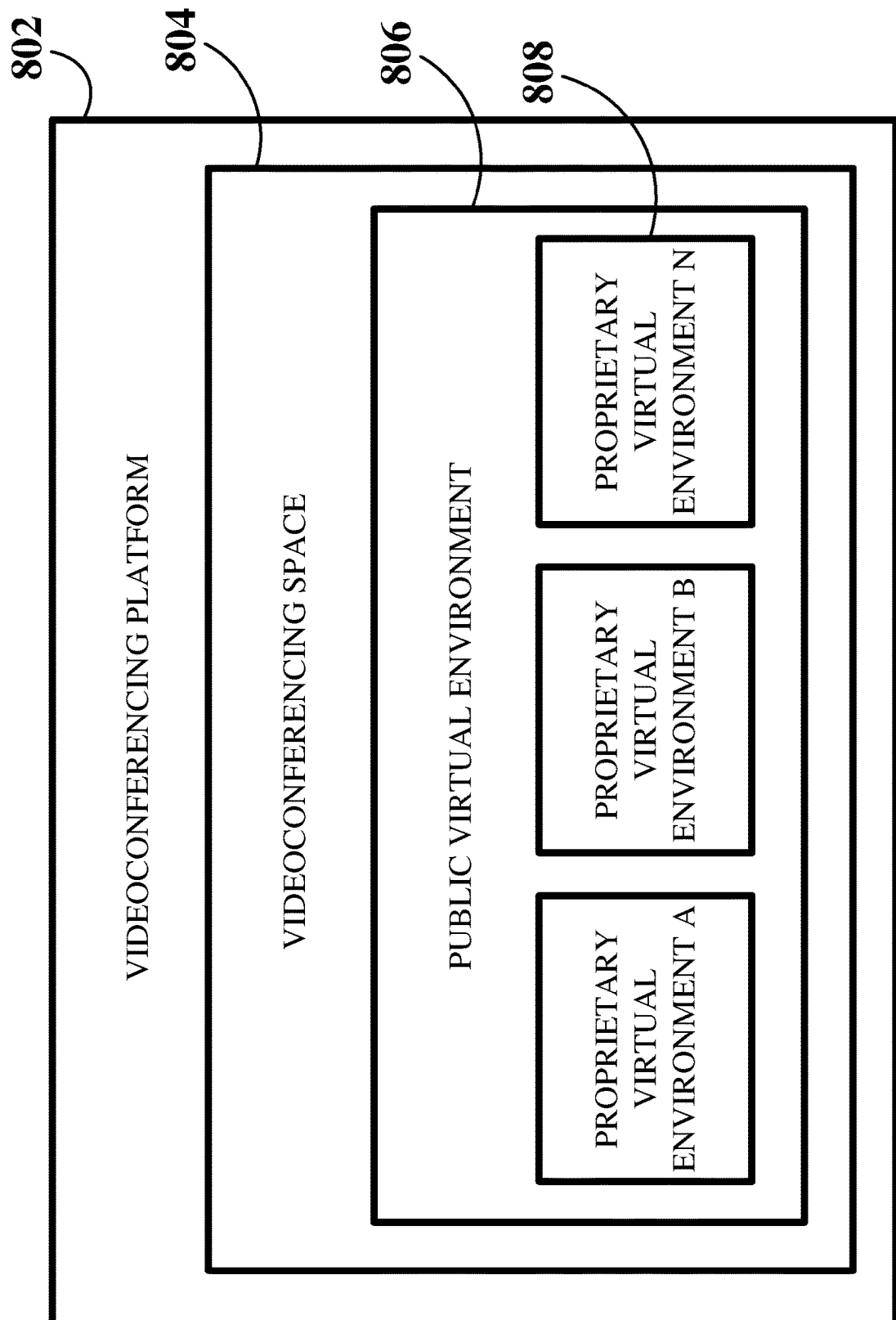

FIGS. 8A-8B show a videoconferencing platform 802 comprising a videoconferencing space 804 with a public virtual environment 806 and a plurality of proprietary virtual environments 808, according to an embodiment.

The public virtual environment 806 refers to a public communication instance that a plurality of users can use to join a public videoconferencing session in a 3D virtual environment where each user can see each other along with the public virtual 3D areas that are accessible to all participants.

In one embodiment, as shown in FIG. 8A, the public virtual environment 806 comprises a plurality of proprietary virtual environments 808, such as proprietary virtual environments A-C, which may be publicly or privately accessible by participants. In one embodiment, responsive to a request from the participant, a host of the proprietary virtual environment 808 may generate, via the deep link generator, a deep link to an invitee configured to position the invitee in a desired 3D coordinate in the private session.

In FIG. 8B, an isometric view of the public virtual environment and plurality of proprietary virtual environments are displayed.

In an example with reference to FIG. 8B, a mall 810 may host a public videoconferencing session in a public 3D virtual environment representing the mall 810. The communication instance is a publicly shared communication instance that all participants may use. The mall 810 may comprise a plurality of stores, such as a shoe store 812 and a clothes store 814, each store comprising its own communication instance, which may be public or private. The public communication instance of a proprietary store refers to a communication instance that participants of a public communication instance (e.g., the mall 810) may access by switching from the public communication instance. The private communication instance of a proprietary store refers to a communication instance that participants of a proprietary store may access only by invitation from, e.g., a host of the proprietary store.

In one embodiment, a host 816 of a third-party proprietary virtual environment retrieves the buyer profile data of a participant entering the third-party proprietary virtual environment via a corresponding user graphical representation and sends a private invitation to the corresponding participant that opens up a private session between the host and the invited participant in a private communication instance.

In the example of FIG. 8B, participants A and B have joined the mall public communication instance and can view the different areas of the mall, including the proprietary stores, and can also view and communicate to each other. In an example of a public communication instance of a proprietary virtual environment, the shoe store 812 proprietary virtual environment may enable mall visitors to walk into the store, triggering a switch in the communication instance from the public mall communication instance to the shoe public communication instance. Within the shoe store 812, a plurality of other users (e.g., users C and D) may also visit the 3D virtual environment of the shoe store 812, all of which may be visible to each other. In an example of a private communication instance of a proprietary virtual environment, a store clerk 816, upon any of users C or D meeting one or more criteria, may decide to open an ad hoc communication channel creating a private communication instance between the store clerk 816 and any one of users C and D. In some embodiments, the criteria are based on user attributes included in the context data of the participant, such as user identification data, spending ranking, and buying preferences. For example, the store clerk 816 may find the spending ranking of user C suitable for a specific offer, and thus may open an ad hoc communication channel with user C to present the offer. User C may be required to confirm interest in such a communication, such as by clicking and approving a deep link sent by the store clerk in order to bring the participant to the private communication session. In a further example of a clothes store 814, the corresponding store clerk 816 may, based on visitors of the clothes store (e.g., users E and F) meeting certain criteria, invite both users to a private communication instance if the users are shopping together, which can be inferred from the user attributes.

In one embodiment, responsive to a request from one of the users, the store clerk 816 generates, via the deep link generator, a deep link to an invitee configured to position the invitee in a desired 3D coordinate in the private session within a proprietary store. For example, the store clerk 816 of the clothes store, upon being requested by user E, may generate a deep link invitation that is sent to user E, who may forward the invitation to a friend or acquaintance to join him or her on the private session in order to view one or more products of interest.

Figure 9:
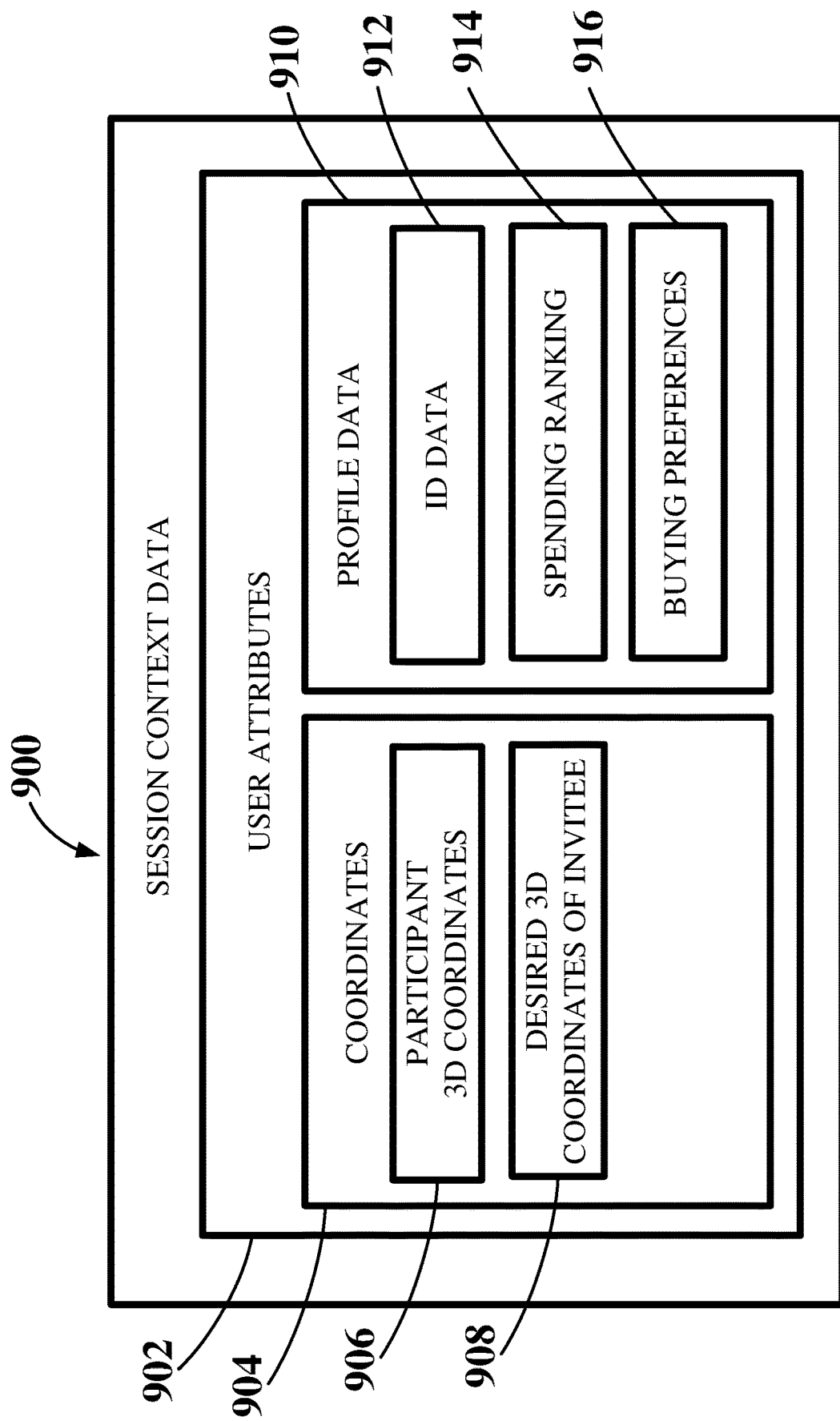
FIG. 9 shows session context data, according to an embodiment.

FIG. 9 shows session context data 900, according to an embodiment.

The session context data 900 may comprise user attributes 902 including coordinates 904 comprising user 3D coordinates 906 and desired coordinates of invitee 908. The session context data 900 may further comprise user profile data 910 including ID data 912, spending ranking 914 and buying preferences 916. The user 3D coordinates 906 refer to the actual latitude, longitude, and elevation of a user graphical representation of a participant within a 3D virtual environment of a videoconferencing space. The desired 3D coordinates of invitee 908 refer to the 3D coordinates where a participant may desire the invitee to arrive to when accessing the videoconferencing session. For example, the participant may prompt the invitee to appear in front of or next to the participant within the videoconferencing session.

The ID data 912 is a specific user code that may be used to identify a corresponding participant, and which may point to a plurality of user personal data including at least spending ranking 914 and buying preferences 916. The spending ranking refers to a ranking provided to the user based on how much he or she spends on products that may be purchased through videoconferencing platforms of the current disclosure, while the buying preferences refers to 916 product categories and characteristics that may reflect the buying preferences of the user when buying through videoconferencing platforms of the current disclosure.

FIG. 10 shows a method 1000 for generating spatial deep links for virtual spaces, which may be implemented by a computer comprising at least one processor and memory comprising instructions configured to implement a plurality of steps. Method 1000 begins in step 1002 by receiving (e.g., by a deep link generator stored in memory) a deep link generation request that is triggered when a participant of a videoconferencing session hosted in a videoconferencing platform invites an invitee to join the videoconferencing session. The method continues in step 1004 by retrieving videoconferencing session context data and a session communication instance. In step 1006, the method ends by generating a deep link comprising the videoconferencing session context data (e.g., in encoded form). The videoconferencing platform connects to the deep link generator and comprises at least one videoconferencing space hosting the videoconferencing session, wherein the at least one videoconferencing space is a 3D virtual environment.

Figure 11:
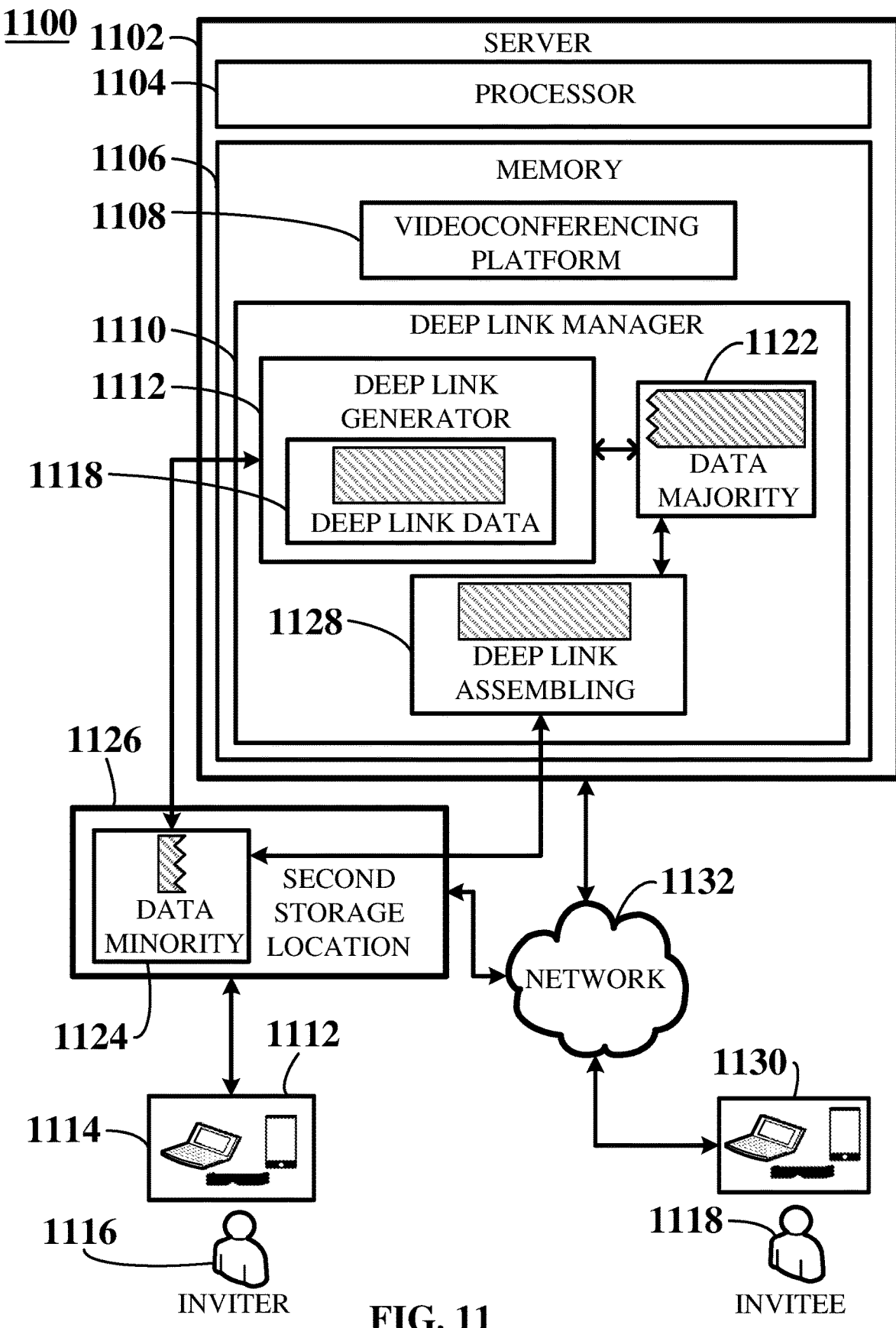
FIG. 11 shows a secure distributed deep link system, according to an embodiment.

FIG. 11 shows a secure distributed deep link system, according to an embodiment.

The distributed deep link system 1100 comprises at least one server computer 1102 of a server computer system comprising at least one processor 1104 and memory 1106 storing instructions executed by said at least one processor 1104, which, when implemented by the at least one processor 1104, implement a videoconferencing platform 1008 and a deep link manager 1110. The deep link manager 1110 in turn implements a deep link generator 1112 configured to receive a deep link generation request, which may be sent, for example, by a client device 1114 of an inviter 1116. Alternatively, the inviter 1116 may also send the deep link generation request by sending the request to an administrator or host client device (not shown) that may gather all requests to join a videoconferencing session in order to set up the videoconferencing session.

The inviter 1116 sending the deep link generation request may be used in embodiments where the inviter 1116 has already joined a videoconferencing session and is willing to invite an invitee 1118 to participate in such a session. For example, the inviter may have joined a videoconferencing session in a 3D virtual environment of a public or private communication instance, may find content within the virtual environment to be of potential interest to an acquaintance (e.g., a virtual store, information of a conference, an exhibition, job fair, etc.), and may thereafter send the deep link generation request with the purpose of generating a deep link that may be used to invite the invitee 1118 to join the same videoconferencing session. Alternatively, the administrator can prepare the deep link generation request by gathering videoconferencing participation requests from a plurality of users and then sending the deep links accordingly employing the distributed deep link system 1100.

The deep link generator 1108 then triggers the generation of a deep link that corresponds to each videoconferencing meeting slot or three-dimensional space of a virtual environment within a videoconferencing session of the videoconferencing platform 108. The deep link generator 1112 splits the deep link data 1120 into at least two data fragments, wherein a first fragment comprises a data majority 1122 and wherein a second data fragment comprises a minority 1124 of the data thereof. In some embodiments, the deep link data comprises the characters that form a deep link URL. In some embodiment, the majority of the deep link data represents between about 90% and about 99% of the deep link data 1120, and the minority of data represents between about 10% and about 1% of the deep link data 1120. In an illustrative scenario, a deep link URL having 1000 characters may be split into two fragments comprising a first portion of 900 characters and a second portion of 100 characters; three fragments comprising a first portion of 900 characters, a second portion of 50 characters, and a third portion of 50 characters; or some other number of fragments or distributions of characters among fragments. As a further alternative, a deep link may be split into fragments where no single fragment contains a majority of the data, such as two fragments that each include a 50% portion of the deep link data, or three fragments having 33%, 33%, and 34% portions of the deep link data, respectively.

The deep link manager 1110 proceeds by distributing the at least two data fragments of the deep link to at least two different storage locations, wherein the data majority 1122 is stored in a first storage location (e.g., the memory 1106 of the server) and the data minority 1124 is stored in at least one second storage location 1126. The deep link generator 1112 then proceeds by generating a link encoding a deep link assembling process 1128 that is sent to the inviter client device 1114.

Deep link data 1120 virtualization enabling the fragmentation of the deep link data 1120 may be performed by the deep link manager 1110. Virtualization mechanisms enables storing different portions of the deep link data 1120 in virtual machines (VMs) without necessarily controlling where these VMs are physically assigned. The VMs can be assigned, for example, to one or more physical servers, which can be part of a larger network of servers comprised in cloud servers, cloudlets, or edge servers. Fragmentation takes data in memory that is broken up into many pieces that are not close together. Data in a file can be managed in units called blocks. Initially, the file blocks may be stored contiguously in a memory located in the private user storage area. However, when fragmenting the data, some of the data blocks can be separated and dispersed into different storage locations, such as into one or more data collector servers. As the storage in the current disclosure is virtualized, the data fragments may be stored in the virtual storage, meaning that the physical storage devices where the data fragments are stored is not of relevance to the system when fetching and assembling the data.

The deep link manager 1110 is further configured to retrieve, upon validation from the inviter 1116, the second data fragment including data minority 1124 of the deep link from the second storage location 1126 and the first data fragment including data majority 1122 of the deep link from the at least one first storage location. Such a validation may take place in the form of the inviter 1116 clicking on a link configured to, upon activation, initiate a deep link assembling process 1128 that assembles the deep link from the data fragments. Such a link may be referred to as an assembling link. The assembling link may include information to facilitate some form of authentication (e.g., biometric scanning, including face scanning, fingerprint scanning, voice recognition, and the like; password; PIN; or combinations thereof). The deep link manager 1110 is further configured to assemble the minority and majority portions 1124 and 1122 of the deep link data 1120, and to grant access to the invitee 1118 to the videoconferencing session. The assembled deep link may then be sent to the invitee 1118 who, upon clicking on the link, may access the videoconferencing session. In some embodiments, the deep link manager 1110 may send the deep link directly to the invitee 1118, or indirectly through the inviter 1116. The invitee may then click on the link and access the videoconferencing session through a corresponding invitee client device 1130. In some embodiments, having the deep link data 1120 stored in two or more different locations and having a deep link assembling process triggered upon validation from the inviter 1116 increases deep link security, as users are not able to validate the deep link assembling process without having the right information.

In some embodiments, after the invitee 1118 clicks on the deep link, the videoconferencing platform 1108 inserts a user graphical representation of the invitee 1118, generated from a live data feed captured by at least one camera, into a 3D coordinate position of a 3D virtual environment of the videoconferencing platform 1108, and combines the user graphical representation therewith. In yet further embodiments, the videoconferencing session is a public videoconferencing session hosted in a public 3D virtual environment in a public communication instance. For example, once an invitee 1118 has clicked on an assembled deep link, the invitee may have his or her user graphical representation inserted into a 3D coordinate of a virtual mall of FIG. 8B, such as in a location close to the inviter 1116. The deep link may also be created to invite an invitee 1118 to a videoconferencing space in a private videoconferencing session accessed through a private communication instance.

In some embodiments, the at least one second storage location 1126 comprises one or more private user servers or client device local memories. The one or more private user servers may be located in data centers destined for the private usage of users for purposes of storing data fragments and hosting the user application. In other embodiments, the one or more private user storage areas may be configured within a user device, such as mobile devices, personal computers, game consoles, media centers, head-mounted displays, and see-through devices (e.g., smart contact lenses).

In other embodiments, the at least one second storage location 1126 is configured within a distributed ledger network. In some embodiments, the at least one first storage location is the memory 1106 of the at least one server computer. The distributed ledger is a trusted database that can function as a record of value storage and exchange. The distributed ledger provides a decentralized network of transactions comprising information that is shared across different locations and people, eliminating the need of a central authority. Storage in a distributed ledger may include the use of encryption in order to keep the deep link data fragments securely stored in the different storage areas. In some embodiments, the deep link data fragments are encrypted by a symmetric or asymmetric key encryption mechanism. In the case of asymmetric key encryption, the data fragments are encrypted asymmetrically by a public key sent to the inviter client device 1114 by the deep link manager 1110 through a network 1132 and are decrypted by the deep link manager 1110 via a private key of the deep link manager 1110 stored in memory 1106 of the server 1102. In other embodiments, data fragments are encrypted symmetrically by a private key of the inviter client device 1114 and are decrypted via the same private key by the deep link manager 1110.

In some embodiments, the deep link generator 1112 is further configured to encode in the deep link an expiration factor, wherein the expiration factor is one of a session-based, or time-based, or click-based expiration factor, or a combination thereof.

In some embodiments, the videoconferencing platform is further configured to receive a videoconferencing meeting slot list, wherein each videoconferencing meeting slot comprises at least a location within the videoconferencing space; receive a participant list, wherein each participant comprises one or more attributes linked to the corresponding participant; create a meeting slot protocol by allocating a videoconferencing meeting slot to each participant based on the one or more attributes; provide one or more entitlements to each videoconferencing meeting slot; and provide the one or more entitlements to the participant of the corresponding videoconferencing meeting slot.

Figure 12:
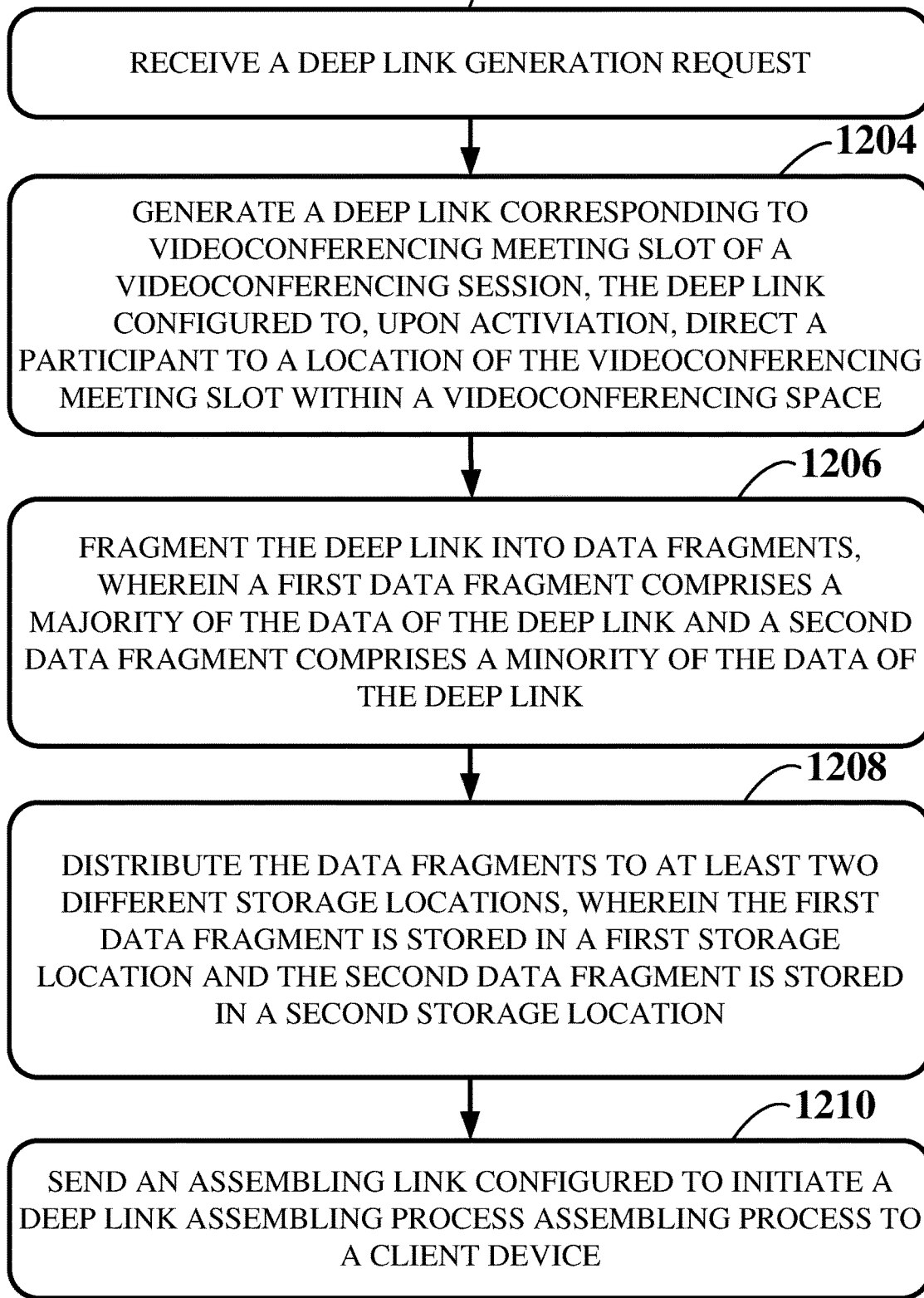
FIG. 12 shows a secure distributed deep link method, according to an embodiment.

FIG. 12 shows a secure distributed deep link method 1200, according to an embodiment.

Method 1200 may start in step 1202 by receiving (e.g., by a deep link generator stored in memory of at least one server computer) a deep link generation request. The deep link generator may be part of a deep link manager stored in memory. The memory may further store a videoconferencing platform that can be accessed by users through a network via corresponding client devices.

In step 1204, the method 1200 continues by generating a deep link that corresponds to (e.g., is unique for) each videoconferencing meeting slot of a videoconferencing session of the videoconferencing platform, each deep link including (e.g., in encoded form) at least the location of the videoconferencing meeting slot within a videoconferencing space. In step 1206, the method 1200 proceeds by fragmenting the deep link into at least two data fragments, wherein at least one data fragment comprises a majority of the data of the deep link and wherein at least another data fragment comprises a minority of the data thereof. In some embodiments, the majority of the deep link data represents between about 99% and about 99.99% of the deep link data, and the minority of data represents between about 1% and about 0.01% of the deep link data.

In step 1208, the method proceeds by distributing the at least two data fragments of the deep link to at least two different storage locations, wherein the majority of the data is stored in memory of at least a first storage location and wherein the minority of the data is stored in memory of at least a second storage location. In step 1210, the method 1200 proceeds by generating an assembling link that, when activated, initiates a deep link assembling process; and in step 1212, the method 1200 ends by sending the assembling link to an inviter client device.

In some embodiments, the at least one second storage location comprises one or more user servers or client device local memories. In other embodiments, the at least one second storage location is configured within a distributed ledger network. In some embodiments, the at least one first storage location is the memory of the at least one server computer.

In some embodiments, the method 1200 further comprises encoding in the deep link an expiration factor, wherein the expiration factor is one of a session-based, or time-based, or click-based expiration factor, or a combination thereof.

Figure 13:
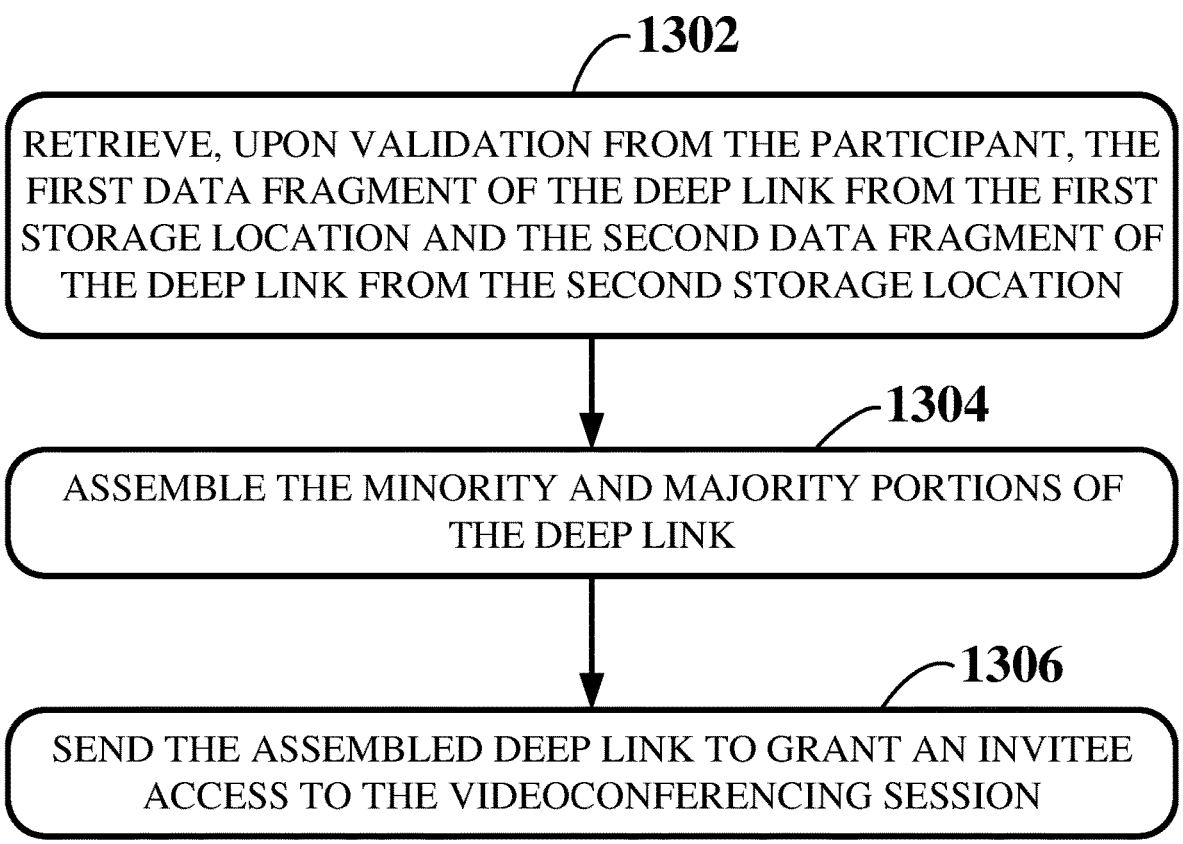
FIG. 13 shows a deep link assembling method, according to an embodiment.

FIG. 13 shows a deep link assembling method 1300, according to an embodiment. Steps from method 1300 may take place after method 1200 of FIG. 12. The method 1300 may start in step 1302 by retrieving, upon validation from the participant, at least one minority data fragment (second data fragment) of the deep link from the second storage location and the majority portion of the deep link (first data fragment) from the at least one first storage location. Such a validation may take place in the form of the inviter clicking on the assembling link initiating a deep link assembling process plus some form of authentication (e.g., biometric scanning, password; PIN; or combinations thereof). The method 1300 continues in step 1304 by assembling the minority and majority portions of the deep link. In step 1306, the method 1300 ends by sending the assembled deep link to grant an invitee access to the videoconferencing session.

In some embodiments, the method 1300 further comprises inserting a user graphical representation of the invitee, generated from a live data feed captured by at least one camera, into a 3D coordinate of the 3D virtual environment and to combine the user graphical representation therewith. In further embodiments, 3D virtual environment in a public communication instance, or is a private videoconferencing session accessed through a private communication instance.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A method for generating secure deep links implemented by a computer comprising at least one processor and memory, the method comprising:
   receiving a deep link generation request;
   receiving a videoconferencing meeting slot list, wherein a videoconferencing meeting slot in the videoconferencing meeting slot list comprises a location within a videoconferencing space of a videoconferencing platform stored in memory;
   generating a deep link corresponding to the videoconferencing meeting slot, wherein the deep link is configured to, upon activation, direct a first participant to the location of the videoconferencing meeting slot within the videoconferencing space; and
   receiving a participant list comprising a plurality of participants including the first participant, wherein each of the plurality of participants has one or more associated attributes;
   selecting the first participant based on the first participant's associated attributes;
   generating an authentication link that has information from the first participant encoded for authentication purposes;
   publishing the authentication link to the list of participants;
   receiving, from a participant client device, a message including information in the authentication link;
   authenticating the first participant; and
   in a case where the identity of the first participant is valid, generating and sending the deep link to the first participant.

2. The method of claim 1, further comprising
   creating a meeting slot protocol by allocating the videoconferencing meeting slot to each of the plurality of participants based on the one or more associated attributes of the respective participants.

3. The method of claim 1, further comprising:
sending the deep link to the participant client device;
receiving a message from the participant client device confirming participation of the first participant on a corresponding videoconferencing session using information in the deep link;
triggering the corresponding video conferencing session for the first participant; and
assigning the first participant to the corresponding videoconferencing meeting slot based on a meeting slot protocol.

4. The method of claim 3, further comprising, after triggering the corresponding videoconferencing session, placing the first participant in a virtual waiting room and adjusting the location of one or more other participants within the waiting room based on an adjusted entitlement.

5. The method of claim 1, wherein the videoconferencing meeting slot further comprises one or more entitlements.

6. The method of claim 5, further comprising providing the one or more entitlements to the first participant, wherein each of the one or more entitlements is adjusted based on one or more attributes associated with the first participant.

7. The method of claim 1, wherein the videoconferencing space is a 2D videoconferencing environment and each videoconferencing meeting slot represents a tile thereof.

8. The method of claim 1, wherein the videoconferencing space is a 3D virtual environment and each videoconferencing meeting slot represents a position including 3D coordinates within the 3D virtual environment.

9. The method of claim 8, further comprising:
receiving, from at least one camera, a live data feed from at least one user of at least one client device;
generating, from the live data feed, a user graphical representation corresponding to the first participant; and
after receiving information in the deep link from the first participant, inserting the user graphical representation corresponding to the first participant into the position of the 3D virtual environment and graphically combining the user graphical representation with the 3D virtual environment.

10. A system for generating secure deep links, the system comprising:
at least one server computer comprising at least one processor and memory comprising instructions configured to cause the at least one server computer to:
receive a deep link generation request;
receive a videoconferencing meeting slot list, wherein a videoconferencing meeting slot in the video conferencing meeting slot list comprises a location within a videoconferencing space;
generate a deep link corresponding to the videoconferencing meeting slot, wherein the deep link is configured to, upon activation, direct a first participant to the location of the videoconferencing meeting slot within the videoconferencing space; and
receive a participant list comprising a plurality of participants, wherein each of the plurality of participants has one or more associated attributes;
select the first participant based on the first participant's associated attributes;
generate an authentication link that has information from the first participant encoded for authentication purposes;
publish the authentication link to the list of participants;
receive, from a participant client device, a message including information in the authentication link;
authenticate the first participant; and
in a case where the identity of the first participant is valid, generate and send the deep link to the first participant.

11. The system of claim 10, wherein the instructions are further configured to cause the at least one server computer to
create a meeting slot protocol by allocating the videoconferencing meeting slot to each of the plurality of participants based on the one or more associated attributes of the respective participants.

12. The system of claim 10, wherein the instructions are further configured to cause the at least one server computer to:
send the deep link to the participant client device;
receive a message from the participant client device confirming participation of the first participant on a corresponding videoconferencing session using information in the deep link;
trigger the video conferencing session for the first participant; and
assign the first participant to the corresponding videoconferencing meeting slot based on a meeting slot protocol.

13. The system of claim 10, wherein the instructions are further configured to cause the at least one server computer to trigger the video conferencing session for the first participant; place the first participant in a virtual waiting room; and adjust the location of one or more other participants within the virtual waiting room based on an adjusted entitlement.

14. The system of claim 11, wherein the videoconferencing meeting slot further comprises one or more entitlements that are provided to the first participant.

15. The system of claim 14, wherein each of the one or more entitlements assigned to the corresponding video conferencing meeting slot is adjusted based on the one or more attributes associated with the first participant.

16. The system of claim 11, wherein the videoconferencing space is a 2D videoconferencing environment and each videoconferencing meeting slot represents a tile thereof, or wherein the videoconferencing space is a 3D virtual environment and each videoconferencing meeting slot represents a position including 3D coordinates within the 3D virtual environment.

17. The system of claim 11, wherein the deep link further encodes an expiration factor, wherein the expiration factor is session-based, time-based, or click-based, or a combination thereof.

18. At least one non-transitory computer-readable medium having stored thereon instructions configured to cause at least one server computer comprising a processor and memory to perform steps comprising:
receiving a deep link generation request;
receiving a videoconferencing meeting slot list, wherein a videoconferencing meeting slot in the videoconferencing meeting slot list comprises a location within a videoconferencing space of a videoconferencing platform;
generating a deep link corresponding to the videoconferencing meeting slot, wherein the deep link is configured to, upon activation, direct a first participant to the location of the videoconferencing meeting slot within the videoconferencing space;
receiving a participant list comprising a plurality of participants, wherein each of the plurality of participants has one or more associated attributes;

select the first participant based on the first participant's associated attributes;
generate an authentication link that has information from the first participant encoded for authentication purposes;
publish the authentication link to the list of participants;
receive, from a participant client device, a message including information in the authentication link;
authenticate the first participant;
in a case where the identity of the first participant is valid, generate and send the deep link to the first participant;
creating a meeting slot protocol by allocating a videoconferencing meeting slot to each of the plurality of participants based on the one or more associated attributes of the respective participants;
sending, via a network, the deep link to the participant client device;
receiving, via the network, a message from the participant client device confirming participation of the first participant on a corresponding videoconferencing session using information in the deep link;
triggering the corresponding videoconferencing session for the first participant; and
assigning the first participant to the corresponding videoconferencing meeting slot based on the meeting slot protocol.

* * * * *